(12) United States Patent
Kusumoto et al.

(10) Patent No.: US 10,759,386 B2
(45) Date of Patent: Sep. 1, 2020

(54) VEHICLE SYSTEM, PORTABLE TERMINAL, AND IN-VEHICLE APPARATUS

(71) Applicant: DENSO CORPORATION, Kariya, Aichi-pref. (JP)

(72) Inventors: Tetsuya Kusumoto, Nishio (JP); Takashi Saitou, Nishio (JP); Koji Sakamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/402,280

(22) Filed: May 3, 2019

(65) Prior Publication Data

US 2019/0256048 A1  Aug. 22, 2019

Related U.S. Application Data

(63) Continuation of application No. PCT/JP2017/038349, filed on Oct. 24, 2017.

(30) Foreign Application Priority Data

Nov. 10, 2016 (JP) .................................. 2016-219648
Jun. 1, 2017 (JP) .................................. 2017-109310

(51) Int. Cl.
| | | |
|---|---|---|
| G05B 19/00 | (2006.01) | |
| G05B 23/00 | (2006.01) | |
| G06F 7/00 | (2006.01) | |
| G06F 7/04 | (2006.01) | |
| G06K 19/00 | (2006.01) | |
| G08B 29/00 | (2006.01) | |
| G08C 19/00 | (2006.01) | |
| H04B 1/00 | (2006.01) | |
| H04B 3/00 | (2006.01) | |
| H04L 9/14 | (2006.01) | |
| H04Q 1/00 | (2006.01) | |

(Continued)

(52) U.S. Cl.
CPC ............ *B60R 25/24* (2013.01); *E05B 49/002* (2013.01); *G01S 5/02* (2013.01); *G01S 13/74* (2013.01); *G01B 7/00* (2013.01)

(58) Field of Classification Search
CPC ......... B60R 25/24; B60R 25/245; G01S 5/02; G01S 13/74; G01S 5/14; E05B 49/002; G01B 7/00
USPC ......................................................... 340/5.2
See application file for complete search history.

(56) References Cited

U.S. PATENT DOCUMENTS

2003/0001723 A1* 1/2003 Masudaya ............... B60R 25/24
340/5.61
2014/0248898 A1* 9/2014 O'Brien ............. G07C 9/00309
455/456.1

(Continued)

FOREIGN PATENT DOCUMENTS

JP      2015040406 A    3/2015

*Primary Examiner* — Tanmay K Shah
(74) *Attorney, Agent, or Firm* — Harness, Dickey & Pierce, P.L.C.

(57) ABSTRACT

Whether a radio wave received by a portable terminal is a radio wave directly received from an in-vehicle apparatus is determined, based on (i) the characteristic related to the direction of the magnetic field or electric field in the radio wave received by the portable terminal, (ii) the information representing the position of the portable terminal, and (iii) the information representing the orientation of the portable terminal.

10 Claims, 22 Drawing Sheets

(51) Int. Cl.
| | | |
|---|---|---|
| *H04Q 9/00* | (2006.01) | |
| *B60R 25/24* | (2013.01) | |
| *G01S 5/02* | (2010.01) | |
| *E05B 49/00* | (2006.01) | |
| *G01S 13/74* | (2006.01) | |
| *G01B 7/00* | (2006.01) | |

(56) References Cited

U.S. PATENT DOCUMENTS

| | | | |
|---|---|---|---|
| 2015/0004917 A1* | 1/2015 | Juzswik | H04B 17/318 455/67.13 |
| 2016/0202697 A1 | 7/2016 | Matsumoto et al. | |
| 2018/0027634 A1* | 1/2018 | Dalavayi | B60Q 1/2669 315/77 |

* cited by examiner

VEHICLE SYSTEM, PORTABLE TERMINAL, AND IN-VEHICLE APPARATUS

CROSS REFERENCE TO RELATED APPLICATIONS

The present application is a continuation application of International Patent Application No. PCT/JP2017/038349 filed on Oct. 24, 2017, which designated the United States and claims the benefit of priority from Japanese Patent Application No. 2016-219648 filed on Nov. 10, 2016 and Japanese Patent Application No. 2017-109310 filed on Jun. 1, 2017. The entire disclosures of all of the above applications are incorporated herein by reference.

TECHNICAL FIELD

The present disclosure relates to a vehicle system including a portable terminal and an in-vehicle apparatus capable of communicating with the portable terminal, and further relates to each of the portable terminal and the in-vehicle apparatus included in the vehicle system.

BACKGROUND

There is conventionally known a vehicle system including a portable terminal carried by a user of a vehicle and an in-vehicle apparatus mounted on the vehicle to have a communication with the portable terminal. In such a vehicle system, when the portable terminal enters a range within a predetermined distance from the vehicle, the communication is automatically performed between the in-vehicle apparatus and the portable terminal. For example, when the in-vehicle apparatus transmits a request signal to the portable terminal, the portable terminal transmits an answer to the in-vehicle apparatus. There may be cases that a repeater that receives and relays the radio waves from the in-vehicle apparatus. In such cases, even if the portable terminal is located at a position away from the in-vehicle apparatus, the portable terminal would perform communication processing as if the portable terminal is within the predetermined distance from the in-vehicle apparatus (hereinafter referred to as performing an erroneous operation).

SUMMARY

According to an example of the present disclosure, whether a radio wave received by a portable terminal is a radio wave directly received from an in-vehicle apparatus is determined, based on (i) the characteristic related to the direction of a magnetic field or electric field in a radio wave received by the portable terminal, (ii) the information representing a position of the portable terminal, and (iii) the information representing an orientation of the portable terminal.

BRIEF DESCRIPTION OF DRAWINGS

The above and other objects, features, and advantages of the present disclosure will become more apparent from the following detailed description made with reference to the accompanying drawings. In the drawings.

DETAILED DESCRIPTION

The following describes embodiments of the present disclosure with reference to the drawings.

1. First Embodiment

[1-1. Configuration]

Figure 1:
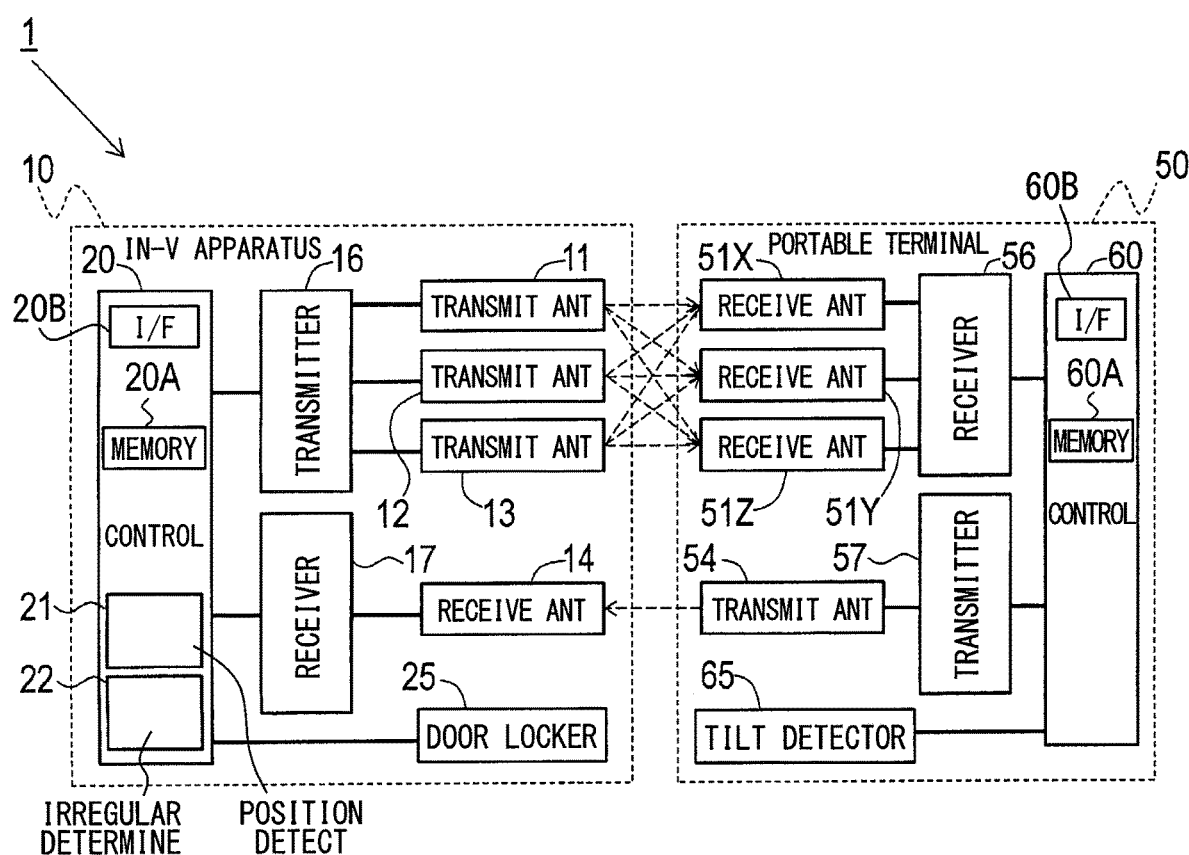
FIG. 1 is a block diagram showing a configuration of a vehicle system according to a first embodiment.

FIG. 1 illustrates a vehicle system 1 that includes an in-vehicle apparatus 10 and a portable terminal 50. The in-vehicle apparatus 10 includes transmission antennas 11, 12, 13, a reception antenna 14, a transmitter unit 16 (which may be also referred to as an in-vehicle transmitter 16), a receiver unit 17 (which may be also referred to as an in-vehicle receiver 17), a control circuit 20 (which may be also referred to as an in-vehicle control circuit 20), and a door locker 25. Further, the portable terminal 50 includes reception antennas 51X, 51Y, and 51Z, a transmission antenna 54, a receiver unit 56 (which may be also referred to as an in-terminal receiver 56), a transmitter unit 57 (which may be also referred to as an in-terminal transmitter 57), a control circuit 60 (which may be also referred to as an in-terminal control circuit 60), and a tilt detector unit 65 (which may be also referred to as an orientation detector unit, an orientation detector circuit, or an orientation detector).

Figure 2:
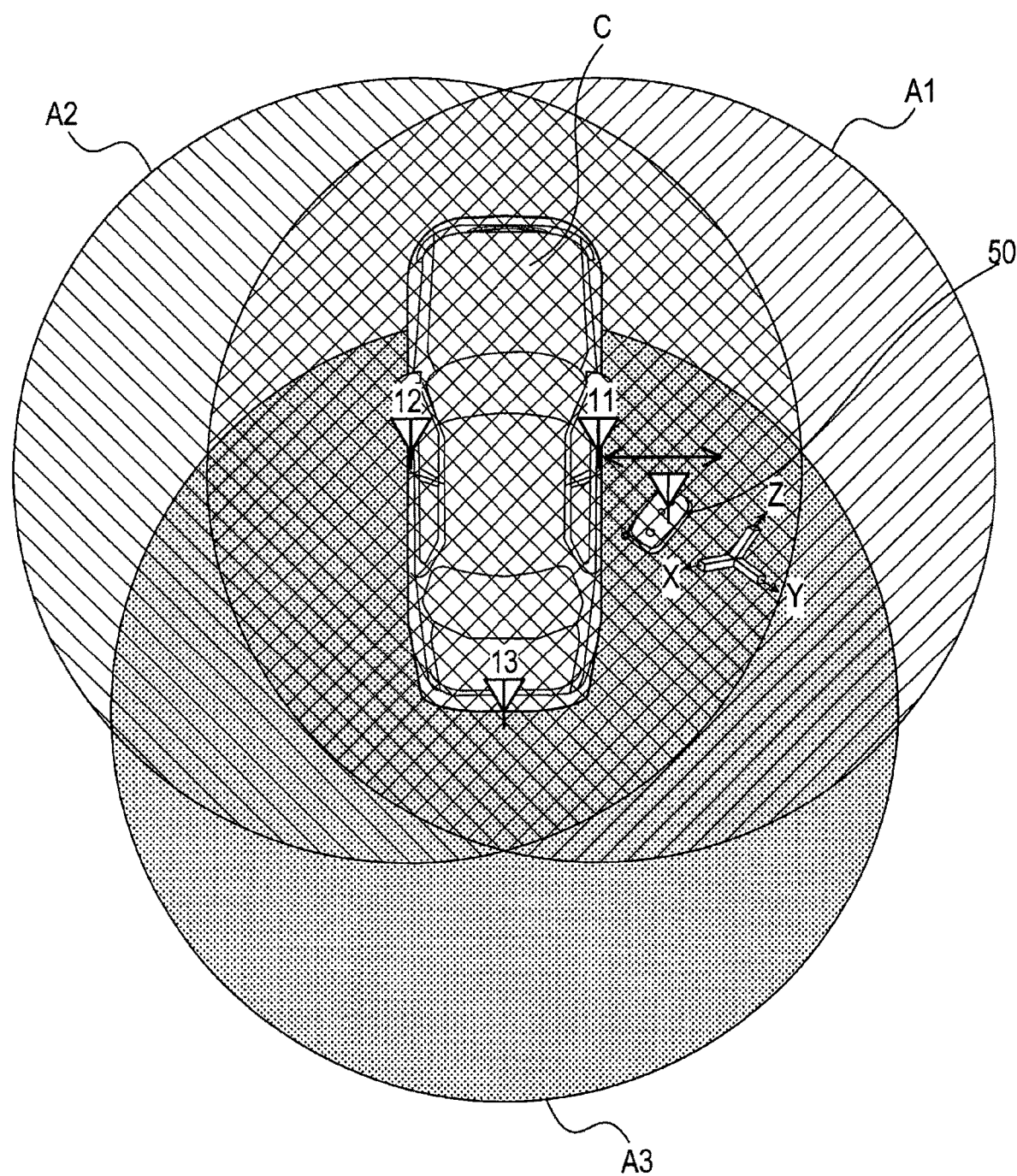
FIG. 2 is a schematic diagram showing an antenna arrangement in the vehicle system.

As shown in FIG. 2, the transmission antennas 11, 12, 13 included in the in-vehicle apparatus 10 are provided at three locations separated from each other in the vehicle C on which the in-vehicle apparatus 10 is mounted. Specifically, the transmission antenna 11 is provided on a right front side of the vehicle C (for example, a right front door). The transmission antenna 12 is provided on a left front side (for example, a left front door) of the vehicle C. The transmission antenna 13 is provided at a center of a rear end of the vehicle C (for example, near a license plate). In addition, the reception antennas 51X, 51Y, 51Z are provided inside the portable terminal 50 so as to be, respectively, arranged along three orthogonal axes (that is, an X axis, a Y axis, and a Z axis) set in the portable terminal 50.

The transmission antennas 11, 12, 13 are set so as to perform individually communication (that is, transmission of radio waves (which may be also referred to as electric waves)) to the reception antennas 51X, 51Y, 51Z using radio waves of a low frequency band (hereinafter referred to as LF band). Note that the LF band as used herein refers to a frequency range approximately from one hundred to several hundred kHz. For example, the frequency of the radio waves may be 134 kHz.

Such a radio wave (e.g., a radio wave transmitted by the transmission antenna 11) attenuates cleanly as the distance from the transmission antenna 11 increases; the communication range of the transmission antenna 11 is as shown in a range A1 in FIG. 2. The radio waves transmitted by the transmission antennas 12, 13 are also similar to the above description; their communication ranges are as shown in ranges A2, A3 in FIG. 2, respectively. In many cases, the user of the vehicle C instructs the locking and unlocking of the door via the portable terminal 50 around the left or right front door. As shown in FIG. 2, in the vicinity of the front doors, the ranges A1, A2, A3 overlap. The relations between the intensities of the magnetic fields and the positions relative to the vehicle C in the communication ranges A1, A2, A3 may be previously measured and stored in a storage to be used in specifying a position of the portable terminal 50 relative to the vehicle C.

The position of the portable terminal 50 is thereby enabled to be determined by comparing the magnetic field intensities of the radio waves received by the reception antennas 51X, 51Y, 51Z of the portable terminal 50 with respect to the radio wave received from each of the transmission antennas 11, 12, 13. The position of the portable terminal 50 is a three-dimensional relative position with respect to the vehicle C; the information representing the position of the portable terminal 50 is an example of information representing at least a planar position of the portable terminal 50 with respect to the in-vehicle apparatus 10. In addition, the ratio of the magnetic field intensities of the radio waves received by the reception antennas 51X, 51Y, 51Z changes according to the three-dimensional orientation (or posture) of the portable terminal 50, that is, the relative directions of the three axes with respect to the vehicle C. Note that in the present application, "information" may be used as being countable as well as uncountable and be equivalent to "an information item"; "a plurality of information" or "a plurality of information(s)" may be used and be equivalent to "a plurality of information items."

Returning to FIG. 1, when the data transmitted to the portable terminal 50 is instructed by the control circuit 20, the transmitter unit 16 energizes the transmission antennas 11, 12, 13 according to the data. For example, a code is formed by setting "1" when radio waves are being output and "0" when not output. The receiver unit 56 converts the magnetic field intensities of the radio waves received by the reception antennas 51X, 51Y, 51Z into digital data and inputs the digital data to the control circuit 60.

The reception antenna 14 of the in-vehicle apparatus 10 receives radio waves transmitted by the transmission antenna 54 of the portable terminal 50. When data transmitted to the in-vehicle apparatus 10 is instructed by the control circuit 60, the transmitter unit 57 conducts electric power to the transmission antenna 54 according to the data. The receiver unit 17 converts the magnetic field intensity of the radio wave received by the reception antenna 14 into digital data and inputs the digital data to the control circuit 20. Note that the communication performed between the transmission antenna 54 and the reception antenna 14 is not necessarily a communication using radio waves in the LF band but may be communication using radio waves in another frequency band. For example, communication using radio waves in the RF band (that is, high frequency band) such as 300 MHz band or the like may be used.

Further, the door locker 25, which may be configured as a door locker circuit, for collectively locking and unlocking the doors in the vehicle C is electrically connected to the control circuit 20. Further, to the control circuit 60, the tilt detector unit 65 for detecting the orientation (or posture) of the portable terminal 50 is electrically connected. The tilt detector unit 65, which may be configured as a circuit, may include various well-known sensors such as a sensor having a level or an acceleration sensor.

The control circuit 60 performs the functions by including sections, which may be configured by a software manner, a hardware manner including a logic circuit and/or analogue circuit, or a combination of the software manner and the hardware manner.

As one example of the present embodiment, the control circuit 60 is configured mainly by using a well-known microcomputer containing a CPU; a semiconductor memory (hereinafter referred to as memory 60A) such as RAM, ROM, and flash memory; an interface 60B; and an internal bus (unshown) connecting the foregoing components to each other. In this example, various functions of the control circuit 60 are realized by the CPU executing a program stored in a non-transitory tangible storage medium. In this example, the memory 60A may correspond to a non-transitory tangible storage medium for storing a program. In the present embodiment, the control circuit 60 transmits the information on the magnetic field intensity of each of the three axes of the radio waves received by the reception antennas 51X, 51Y, 51Z and the tilt information representing the orientation detected by the tilt detector unit 65 via the transmission antenna 54.

As shown in FIG. 1, the control circuit 20 performs the functions by including sections such as a position detector section 21 (which may be also referred to as a position controller or a position detector) and an irregularity determiner section 22 (which may be also referred to as a controller). The sections may be configured by a software manner, a hardware manner including a logic circuit and/or analogue circuit, or a combination of the software manner and the hardware manner.

As one example of the present embodiment, the control circuit 20 is configured mainly by using a well-known microcomputer containing a CPU; a semiconductor memory (hereinafter referred to as memory 20A) such as RAM, ROM, and flash memory; an interface 20B, and an internal bus (unshown) connecting the foregoing components to each other. The various functions of the control circuit 20 are realized by the CPU executing a program stored in a non-transitory tangible storage medium. In this example, the memory 20A may also function as a non-transitory tangible computer-readable storage medium storing instructions of a program. In addition, by executing the program, a method corresponding to the program is executed. The number of microcomputers included in the control circuit 20 may be one or more.

[1-2. Processes]

Next, processes executed by the control circuit 20 and the control circuit 60 will be described. As shown in the time chart of FIG. 3, radio waves composed of different linearly polarized waves each having the same degree of magnetic field intensity are sequentially transmitted from the transmission antennas 11, 12, 13 in a time sharing manner. Each of the reception antennas 51X, 51Y, 51Z sequentially receives these radio waves. Which one of the transmission antennas 11 to 13 has transmitted the radio wave received via the reception antennas 51X to 51Z is identified with a code or the like formed by the radio wave. Note that the identification of which antenna among the transmission antennas 11 to 13 has transmitted the received radio wave may be made based on the radio wave reception time points by providing a clock synchronized between the in-vehicle apparatus 10 and the portable terminal 50. The identification of which antenna among the transmission antennas 11 to 13 has transmitted the received wave may be made by differentiating the axial directions of the linearly polarized waves transmitted by the transmission antennas 11, 12, 13 from each other.

Figure 3:
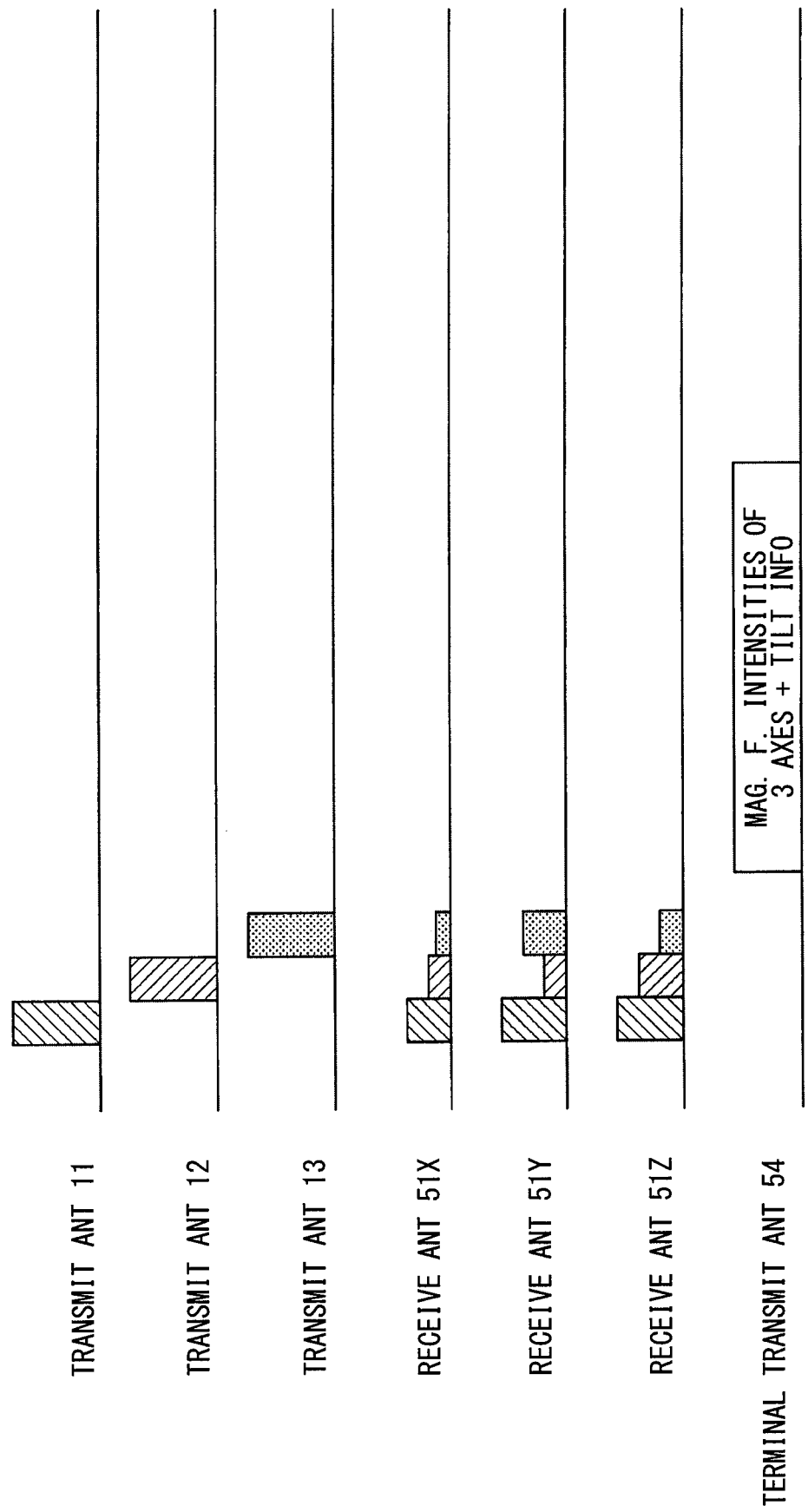
FIG. 3 is a time chart showing an operation of the vehicle system.

As shown in FIG. 3, the magnetic field intensity of each of the received radio waves differs depending on which one of the transmission antennas 11, 12, 13 has transmitted, and depending on which of the reception antennas 51X, 51Y, 51Z has received. The reason why the magnetic field intensity differs in this way is caused by at least one of the followings. That is, the effect of the vehicle C on each radio wave that is different for each of the transmission antennas 11, 12, 13; the distances between the transmission antennas 11, 12, 13 and the portable terminal 50 being different from each other; and the orientation of the portable terminal 50 receiving the radio waves from the transmission antennas 11, 12, 13.

The control circuit 60 acquires, from the receiver unit 56, the magnetic field intensity (that is, the magnetic field intensity of each of the three axes) of the radio wave received by each of the reception antennas 51X, 51Y, 51Z at each time point of the radio wave transmission time points from the transmission antennas 11, 12, 13. As shown in the lowermost part of FIG. 3, along with the tilt information acquired via the tilt detector unit 65, the magnetic field intensities of the three axes (that is, the nine magnetic field intensities in total) acquired at respective time points are transmitted from the transmission antenna 54 to the reception antenna 14.

Then, the position detector section 21 in the control circuit 20 specifies (i.e., detect) the position of the portable terminal 50 with respect to the vehicle C by comparing the magnetic field intensities of the radio waves received from the transmission antennas 11, 12, 13, respectively. Further, the irregularity determiner section 22 determines the presence or absence of an irregularity based on (i) the information representing the specified position, (ii) the magnetic field intensity, and (iii) the tilt information of each of the three axes. Note that the irregularity referred to here signifies that the radio waves transmitted from the transmission antennas 11, 12, 13 are relayed via a repeater, respectively.

Suppose cases that the radio wave transmitted from the transmission antenna 11 or the transmission antenna 12 or the transmission antenna 13 is received directly (that is, without being relayed) at the position specified by the position detector section 21. In such cases, the direction and magnitude of the vector of the magnetic field of the radio wave fall within a predetermined range. The direction of the vector of the magnetic field referred to here is the direction in the coordinate system with the vehicle C as a reference. Therefore, the irregularity determiner section 22 determine whether or not the received radio wave is a radio wave directly transmitted from the in-vehicle apparatus 10, (i.e., whether or not a relay (that is, irregular) is made) by the following process.

Details of the processes will be described below in detail with reference to the flowcharts of FIGS. 4, 5. The control circuit 20 in the in-vehicle apparatus 10 periodically executes a process shown in FIG. 4 by using sections (e.g., expressed as S11). In this process, by sequentially executing the processing of S11, S12, S13, it is possible to transmit the respective radio waves in the LF band by the transmission antenna 11, the radio wave in the LF band by the transmission antenna 12, the radio wave in the LF band by the transmission antenna 13, sequentially in time divisions. In S14, the magnetic field intensities and the tilt information of each of the three axes are received from the portable terminal 50 in response to that the portable terminal 50 executes the following processing in FIG. 5.

Figure 5:
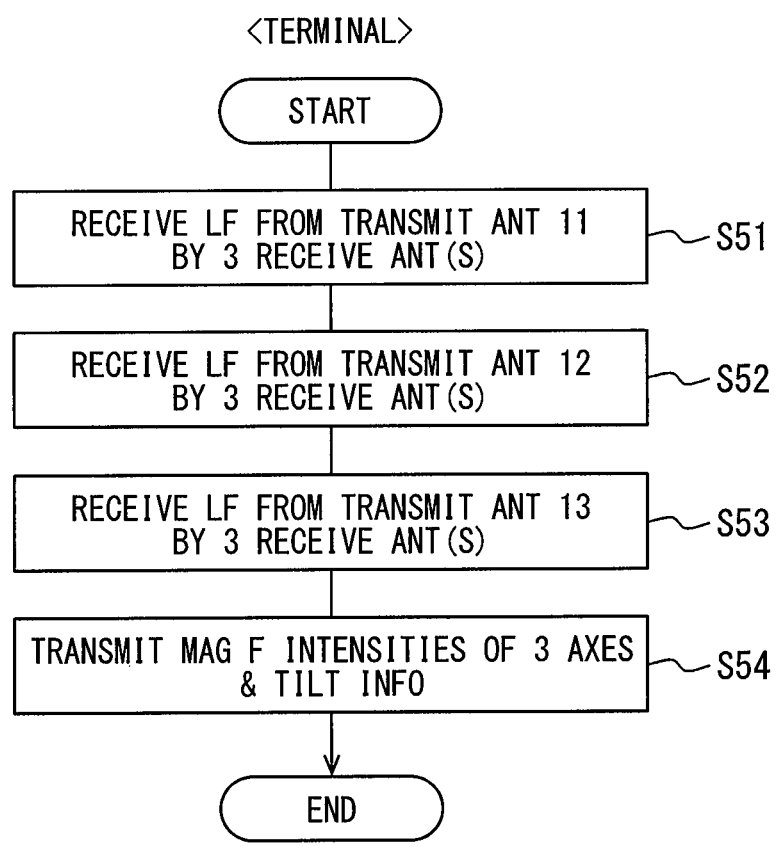
FIG. 5 is a flowchart of a process in a portable terminal of the vehicle system.

The control circuit 60 in the portable terminal 50 executes the processing shown in FIG. 5 for responding to the processing of S11 to S13 in the control circuit 20, by using sections (e.g. expressed as S51). In S51, the radio wave in the LF band transmitted from the transmission antenna 11 at the time point of S11 is received via the reception antennas 51X, 51Y, 51Z, individually. The magnetic field intensity of the radio wave received by each of the reception antennas 51X, 51Y, 51Z is temporarily stored in the RAM provided in the control circuit 60.

In subsequent S52, the radio wave of the LF band transmitted from the transmission antenna 12 at the time point of S12 are received via the reception antennas 51X, 51Y, 51Z, individually. Further in S53, the radio wave in the LF band transmitted from the transmission antenna 13 at the time point of S13 is received via the reception antennas 51X, 51Y, 51Z, individually. Also in each of S52 and S53, the magnetic field intensity of the radio wave received by each of the reception antennas 51X, 51Y, 51Z is temporarily stored in the RAM in the control circuit 60 so as to be distinguishable from the magnetic field intensity of the radio wave received in S51. As a result, the information on nine magnetic field intensities in total are stored in the RAM.

In S54, the magnetic field intensities of each of the three axes (that is, the information on nine magnetic field intensities in total) and the tilt information acquired via the tilt detector unit 65 are transmitted from the transmission antenna 54. The process is once ended.

Figure 4:
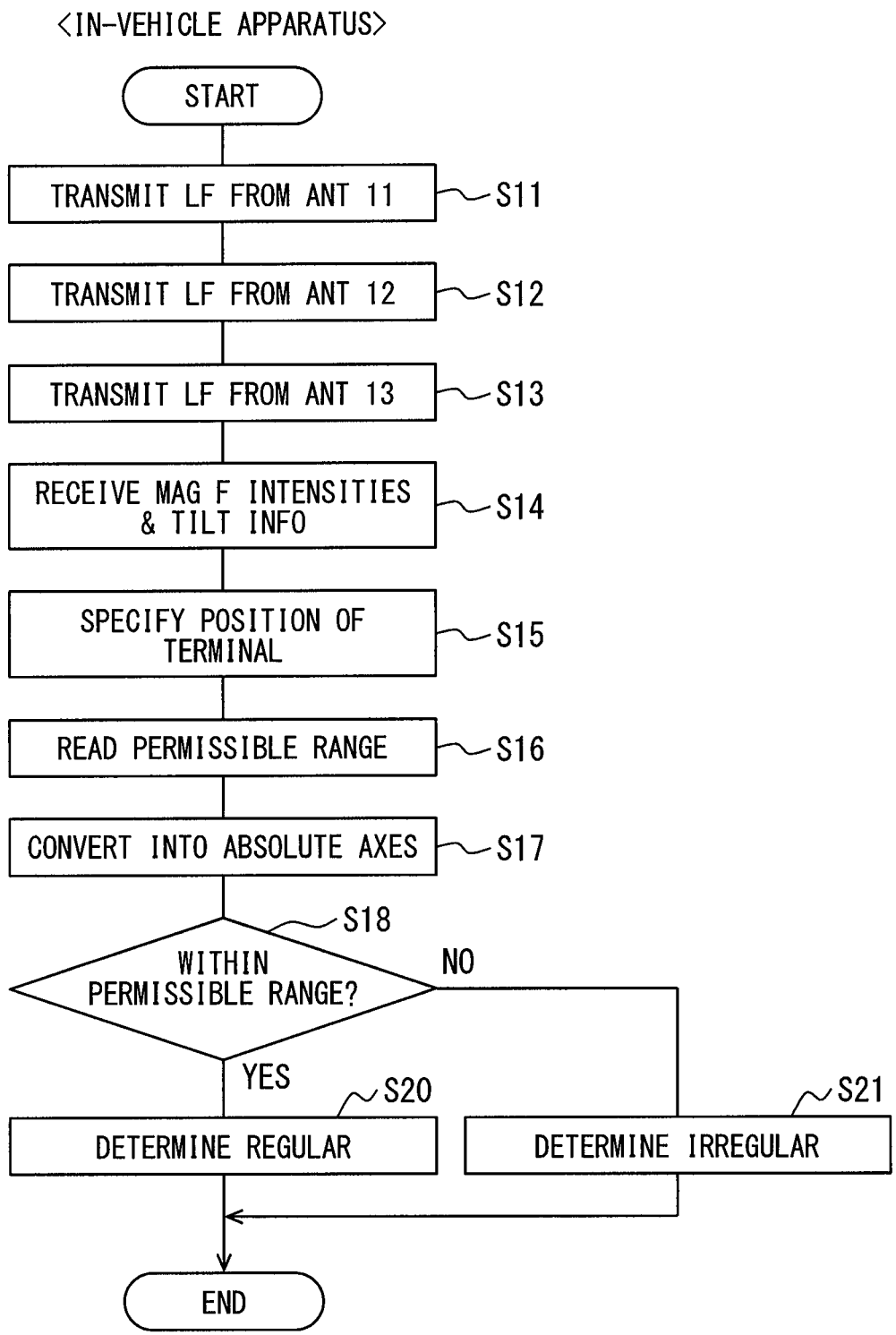
FIG. 4 is a flowchart of a process in an in-vehicle apparatus of the vehicle system.

In S14 shown in FIG. 4, the magnetic field intensities of each of the three axes and the tilt information transmitted by the processing of S54 in the control circuit 60 are received via the reception antenna 14. In S15 subsequent to S14, processing for specifying the position of the portable terminal 50 with respect to the vehicle C is executed by comparing the magnetic field intensities of each of the three axes for each radio wave received from the transmission antennas 11, 12, 13. This processing is processing as the position detector section 21 in the control circuit 60.

In this manner, when the position of the portable terminal 50 with respect to the vehicle C is specified, it may be inferred what kind of magnetic field intensity each of the radio waves transmitted from the transmission antennas 11, 12, 13 is received at the specified position. The magnetic field intensity referred to here is each component in an orthogonal coordinate system (hereinafter referred to as an absolute axis system) having a Z axis in the vertical direction of the vehicle C, a Y axis in the width (lateral) direction of the vehicle C, and an X axis in the length (longitudinal) direction of the vehicle C. The absolute axis system may be an orthogonal coordinate system with reference to the vehicle C, and various orthogonal coordinate systems other than the above may also be applied. Therefore, in the following S16, the permissible range of the magnetic field intensity of each axis corresponding to the position specified in S15 is read from the ROM in the control circuit 20.

Note that the permissible range signifies as follows. That is, suppose cases that radio wave transmitted from the transmission antenna 11, 12, or 13 is received directly (that is, without being relayed) at the position specified by the position detector section 21. In such cases, the range of each component of the magnetic field vector is the permissible range. This permissible range becomes more conspicuous in the case that the axis of the transmission antenna is horizontal than in the case where the axis is vertical.

In the following S17, the magnetic field intensities of each of the three axes, which are received from the portable terminal 50 in S14, are converted (coordinate conversion) into the magnetic field intensities for each axis of the absolute axis system based on the tilt information also received in S14. Then, in S18, it is determined whether or not the magnetic field intensities for each axis after the conversion are within the permissible range read in S16. When it is determined in S18 that they are within the permissible range (i.e., Yes), it is determined to be regular in S20 and the process is temporarily ended. On the other hand, when it is determined in S18 that they are out of the permissible range (i.e., No), it is determined to be irregular in S21, and the process is temporarily ended.

In this way, when the determination in S20 or S21 is made, it is possible to apply the determination results to the various well-known controls such as control of prohibiting or permitting the locking and unlocking of the door, control of prohibiting or permitting the start of the vehicle. For example, when it is determined to be regular in S20, it is regarded that the authorized user is near the vehicle C; thus, the control is executed to permit locking and unlocking of the door or the startup of the vehicle. When it is determined to be irregular in S21, it is regarded that the authorized user is not near the vehicle C; thus, the control is executed to prohibit locking and unlocking the door or the startup of the vehicle. In this process, the processing of S18, S20, S21 is the processing as the irregularity determiner section 22.

[1-3. Effects]

According to the present embodiment described above, the following effects can be obtained.

(1A) In the present embodiment, based on (i) the characteristic related to the direction of the magnetic field in the radio wave received by the portable terminal 50, (ii) the information representing the position of the portable terminal 50 with respect to the vehicle C, and (iii) the tilt information representing the orientation of the portable terminal 50, the following determination is made. That is, it is determined whether or not the radio wave received by the portable terminal 50 is a radio wave directly received from the in-vehicle apparatus 10 based on the characteristic, the information representing the position, and the tilt information. That is, it is determined whether it is regular or irregular.

Even if a repeater equipped with a plurality of antennas is used when relaying the radio wave transmitted from the in-vehicle apparatus 10, it is difficult to set the characteristic relating to the direction of the magnetic field in the radio wave received by the portable terminal 50 to be the characteristic corresponding to the information representing the position and the tilt information. Therefore, in the present embodiment, it is possible to accurately determine whether or not the radio wave received by the portable terminal 50 is a radio wave directly received from the in-vehicle apparatus 10.

(1B) In addition, in the present embodiment, the determination is made by simultaneously referring to the magnitude of the magnetic field as the magnetic field intensities of each of the three axes, in addition to the direction of the magnetic field in the radio wave. When the radio wave transmitted from the in-vehicle apparatus 10 is relayed, it is more difficult to set the characteristic relating to the direction of the magnetic field in the radio wave received by the portable terminal 50 to correspond to the information representing the position and the tilt information along with the intensity of the magnetic field. Therefore, in the present embodiment, it is possible to more accurately determine whether or not the radio wave received by the portable terminal 50 is a radio wave directly received from the in-vehicle apparatus 10.

(1C) In the present embodiment, the process executed by the portable terminal 50 is simpler than the process executed by the in-vehicle apparatus 10. Therefore, the processing load of the control circuit 60 in the portable terminal 50 can be reduced, and the battery of the portable terminal 50 can be lengthened.

Figure 6:
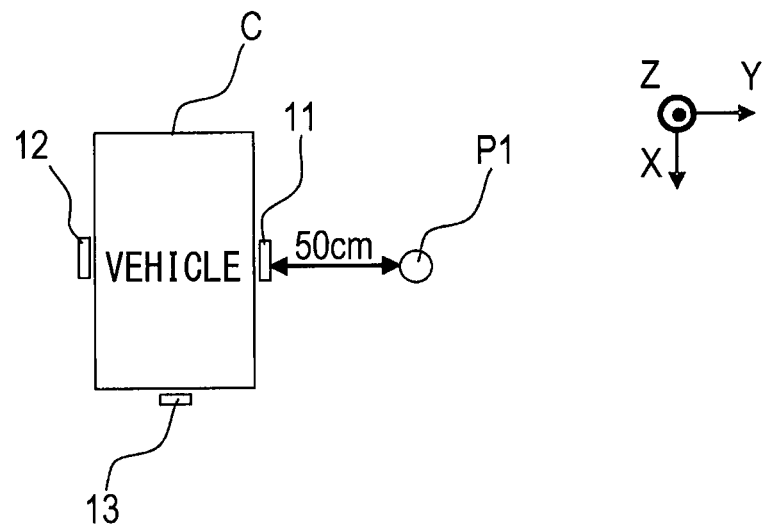
FIG. 6 is an explanatory diagram showing a regular reception example in an experiment related to an effect of the vehicle system.

Next, the effects of the above (1A) and (1B) will be explained using specific experiment examples. FIG. 6 shows a regular reception example, in which the Z axis in the absolute axis system is set in the direction from the bottom to the top of the vehicle C. In addition, on this absolute axis system, the Y axis is set in the direction from the left to the right of the vehicle C, that is, in the direction from the transmission antenna 12 to the transmission antenna 11.

In a regular reception example (hereinafter, regular state) shown in FIG. 6, the portable terminal 50 is arranged at a point P1 that is 50 cm away from the transmission antenna 11 in the Y axis direction (that is, the +Y direction) and receives the radio wave from each of the transmission antennas 11, 12, 13.

Figure 7:
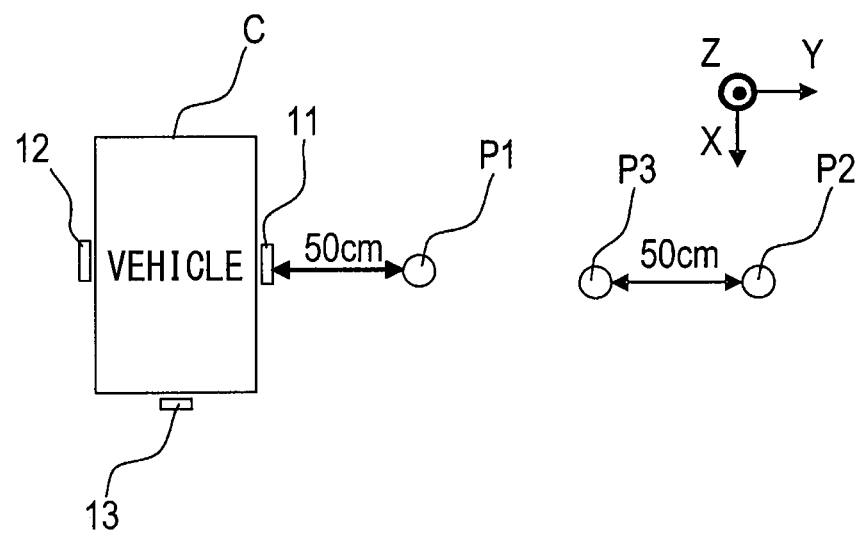
FIG. 7 is an explanatory diagram showing an irregular reception example in an experiment related to an effect of the vehicle system.

On the other hand, suppose an irregular reception example shown in FIG. 7 (hereinafter referred to as irregular state), in which the repeaters are respectively placed (i) at the point P1 and (ii) at the point P3 which is 50 cm away in the −Y direction (in the negative direction of the Y axis) from the point P2 where the portable terminal 50 is arranged. Then, it is supposed that the same radio wave as the radio wave received at the point P1 is transmitted from the point P3.

Figure 8:
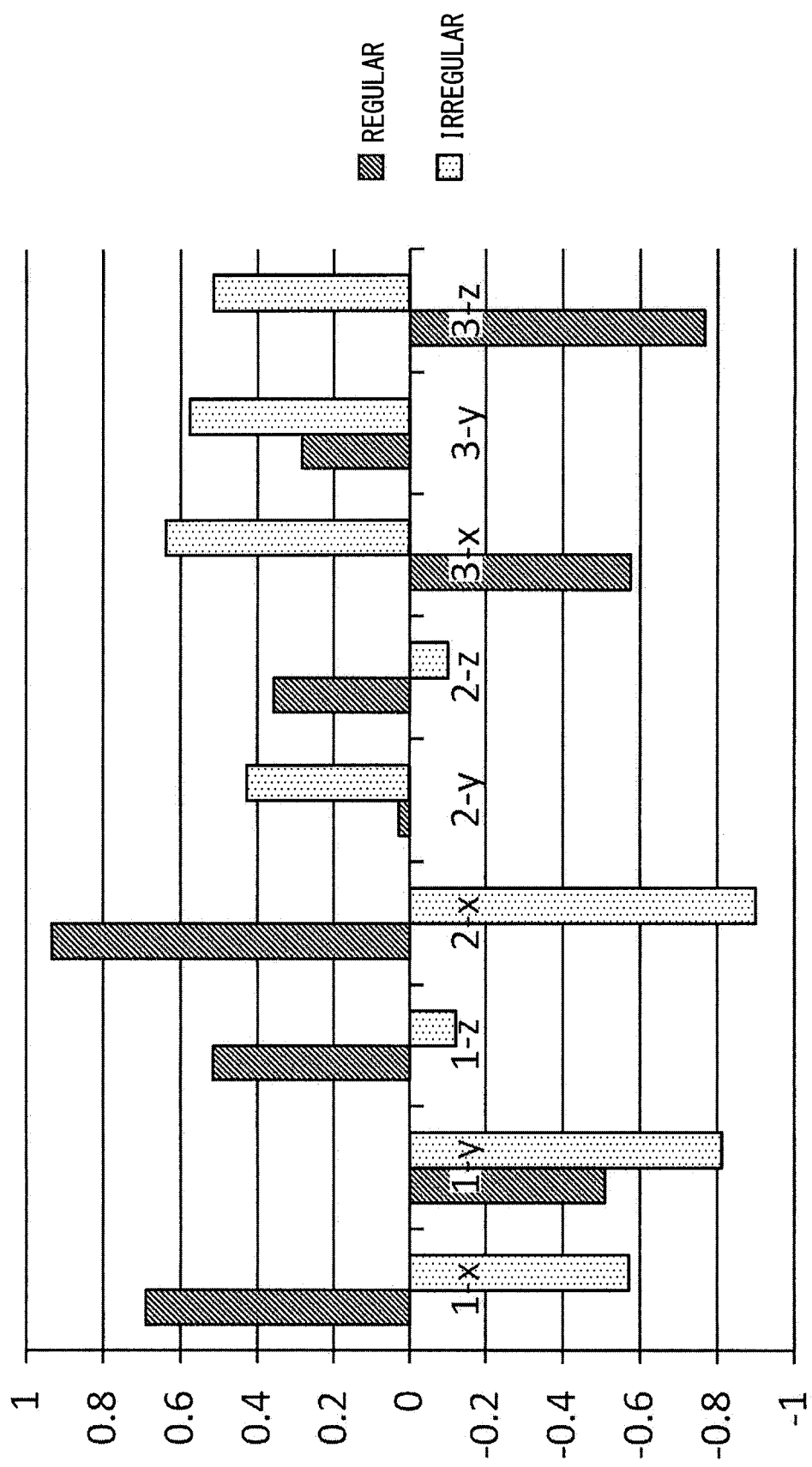
FIG. 8 is a graph showing a comparison between the respective reception examples.

FIG. 8 illustrates respective axis components (that is, the nine magnetic field intensities in total) on the absolute axis system of the magnetic field intensities of the radio waves received from the respective transmission antennas 11, 12, 13, as follows. That is, the X component of the magnetic field intensity of the radio wave received from the transmission antenna 11 is expressed as 1-$x$, the Y component of the magnetic field intensity thereof is expressed as 1-$y$, and the Z component of the magnetic field intensity thereof is expressed as 1-$z$. Further, the X component of the magnetic field intensity of the radio wave is expressed as 2-$x$, and so on.

In this case, as shown in FIG. 8, between the irregular state and the regular state, the sign (positive or negative) of each of the X component and the Z component is reversed. Further, between the irregular state and the regular state, the magnitude of each component of X, Y, Z is different. Therefore, the portable terminal 50 arranged at the point P2 will not perform an erroneous operation as if it is located at the point P1. In this manner, when relaying the radio wave transmitted from the in-vehicle apparatus 10, it is difficult to cause the characteristic relating to the direction of the magnetic field in the radio wave received by the portable terminal 50 to have the characteristic corresponding to the information representing the position and the information representing the orientation.

In the first embodiment, the respective elements or components may be differently referred to as follows. The position detector section 21 may be also referred to as a position detector or a position controller. The tilt detector unit 65 may be also referred to as an orientation detector unit, an orientation detector circuit, or an orientation detector. The irregularity determiner section 22 may be also referred to as a controller. The irregularity determiner section 22 and the position detector section 21 may be collectively referred to as a determiner section or a controller. The transmitter unit 57 may be also referred to as an intensity transmitter unit, an information transmitter unit, or an in-terminal transmitter. The receiver unit 56 may be also referred to as an intensity acquirer unit or an in-terminal receiver. The receiver unit 17 may be also referred to as an information receiver unit or an in-vehicle receiver.

2. Second Embodiment

[2-1. Difference from First Embodiment]

Since the basic configuration of a second embodiment is the same as that of the first embodiment, the description of the common configuration will be omitted, and the difference will be mainly described. Note that the same reference signs as those in the first embodiment indicate the same configuration, and refer to the preceding descriptions.

In the first embodiment described above, the position detector section 21 and the irregularity determiner section 22 are provided in the control circuit 20 of the in-vehicle apparatus 10. On the other hand, the second embodiment is different from the first embodiment in that a position detector section 61 and an irregularity determiner section 62 are provided in the control circuit 60 of the portable terminal 50 as shown in FIG. 9.

Figure 9:
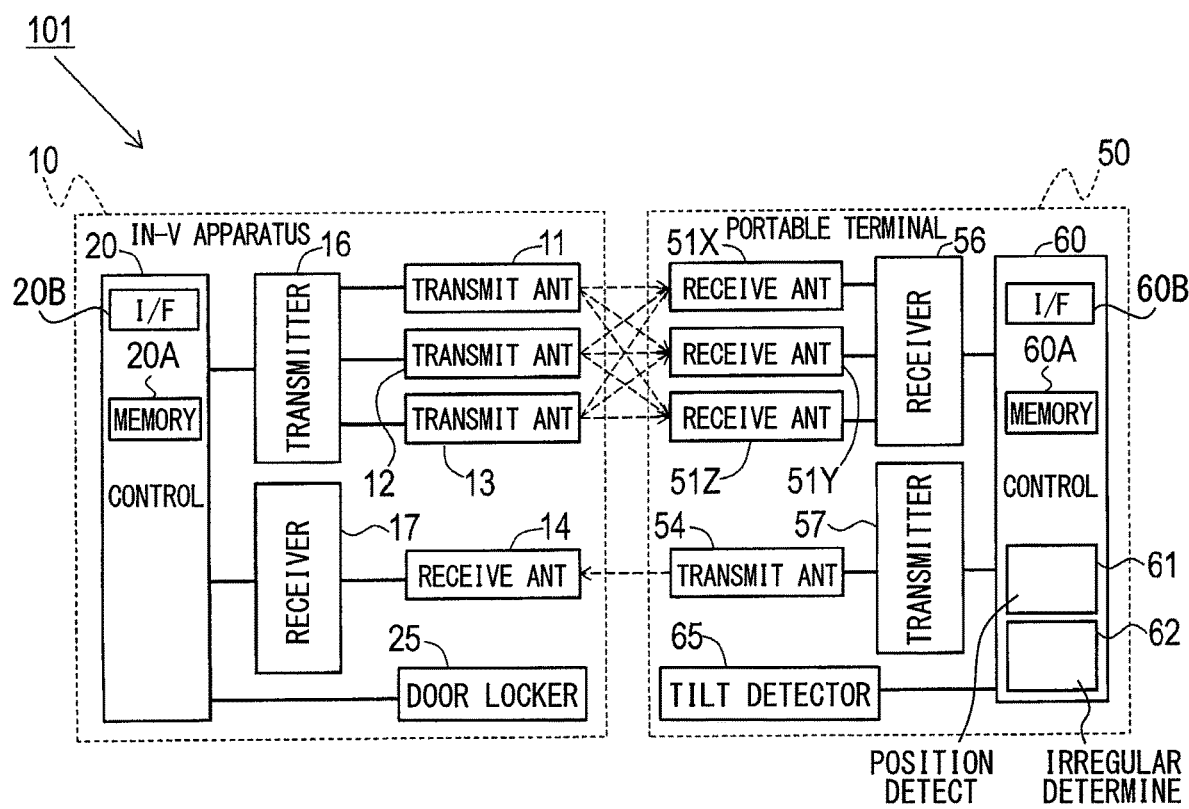
FIG. 9 is a block diagram showing a configuration of a vehicle system according to a second embodiment.

As shown in FIG. 9, the control circuit 60 performs the functions by including sections such as a position detector section 61 (which may be also referred to a position controller or a position detector) and an irregularity determiner section 62 (which may be also referred to as a controller). The sections may be configured by a software manner, a hardware manner including a logic circuit and/or analogue circuit, or a combination of the software manner and the hardware manner.

As an example of the present embodiment, similar to the first embodiment, the control circuit 60 is configured mainly by using a well-known microcomputer including a CPU, and a semiconductor memory (hereinafter, memory 60A) such as RAM, ROM, and flash memory. The various functions of the control circuit 60 are realized by the CPU executing a program stored in a non-transitory tangible storage medium. In this example, the memory 60A corresponds to a non-transitory tangible storage medium storing a program. In addition, by executing the program, a method corresponding to the program is executed. The number of microcomputers included in the control circuit 60 may be one or more.

[2-2. Processes]

Figure 10:
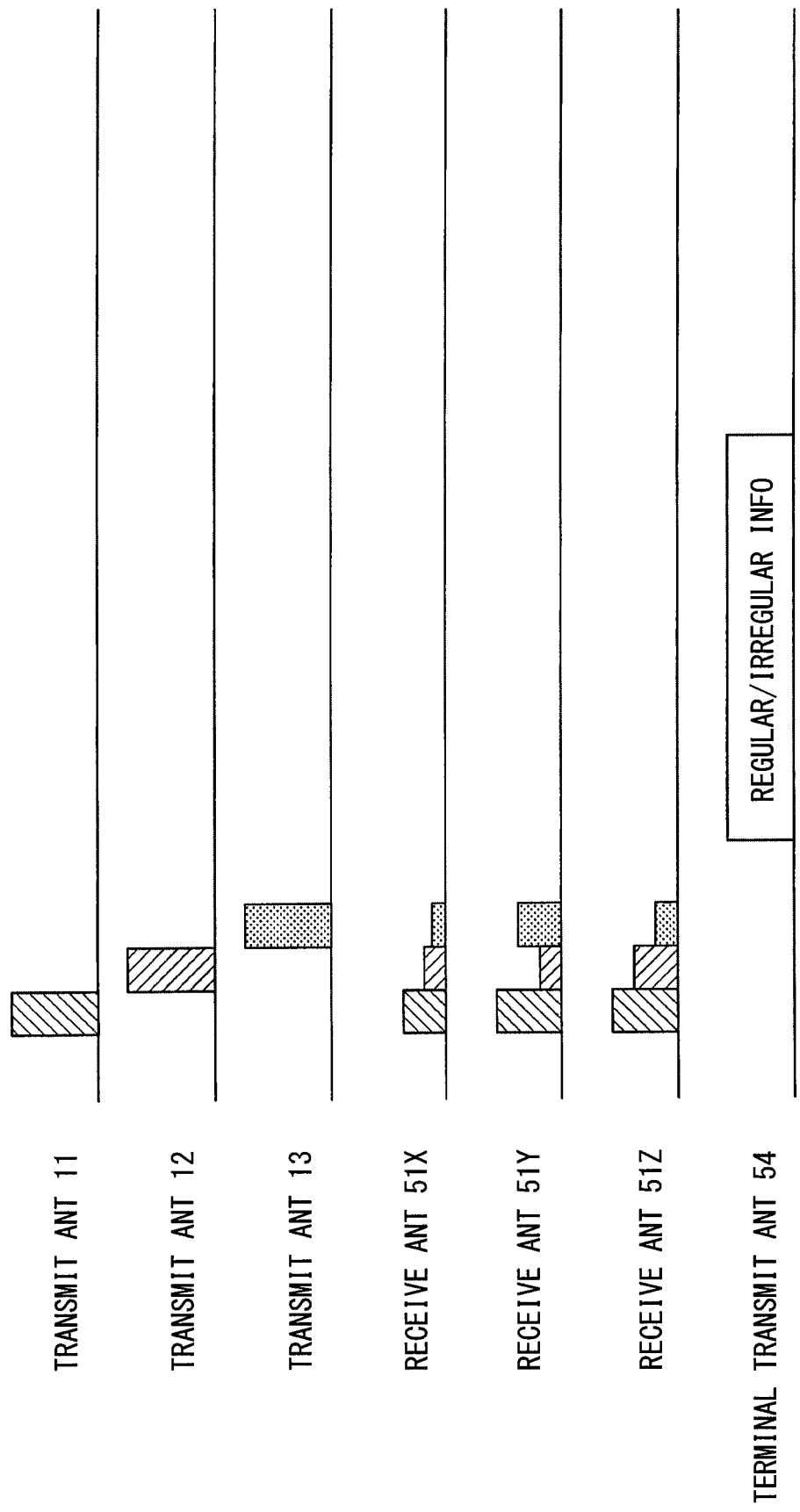
FIG. 10 is a time chart showing an operation of the vehicle system.

In a vehicle system 101 according to the present embodiment, the position detector section 61 in the control circuit 60 of the portable terminal 50 compares the magnetic field intensities of the radio waves received from the transmission antennas 11, 12, 13, individually, thereby specifying the position of the portable terminal 50. Further, the irregularity determiner section 62 determines the presence or absence of an irregularity based on the information representing the specified position, the magnetic field intensities, and the tilt information of each of the three axes. For this reason, as shown in FIG. 10, the irregularity presence/absence information representing the determination result of the irregularity determiner section 62 is transmitted from the transmission antenna 54 of the portable terminal 50 to the reception antenna 14 of the in-vehicle apparatus 10.

Figure 11:
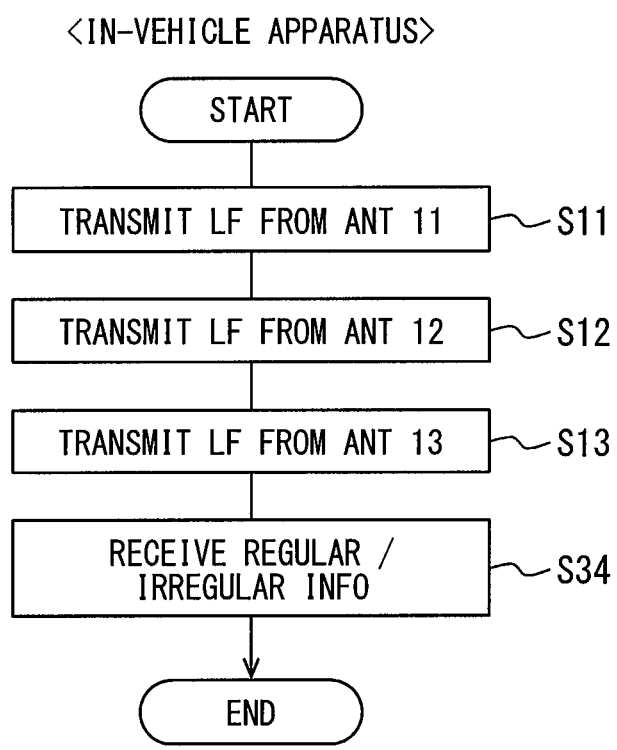
FIG. 11 is a flowchart of a process in an in-vehicle apparatus of the vehicle system.

Details of the processing will be described in detail below with reference to the flowcharts of FIGS. 11, 12. As shown in FIG. 11, the process executed by the control circuit 20 in the in-vehicle apparatus 10 is different from the process shown in FIG. 4 in that the processing of S34 is executed after the processing of S11 to S13 is executed. In S34, the irregularity presence/absence information transmitted by the following process in the portable terminal 50 is received via the reception antenna 14, and the process is temporarily ended.

Figure 12:
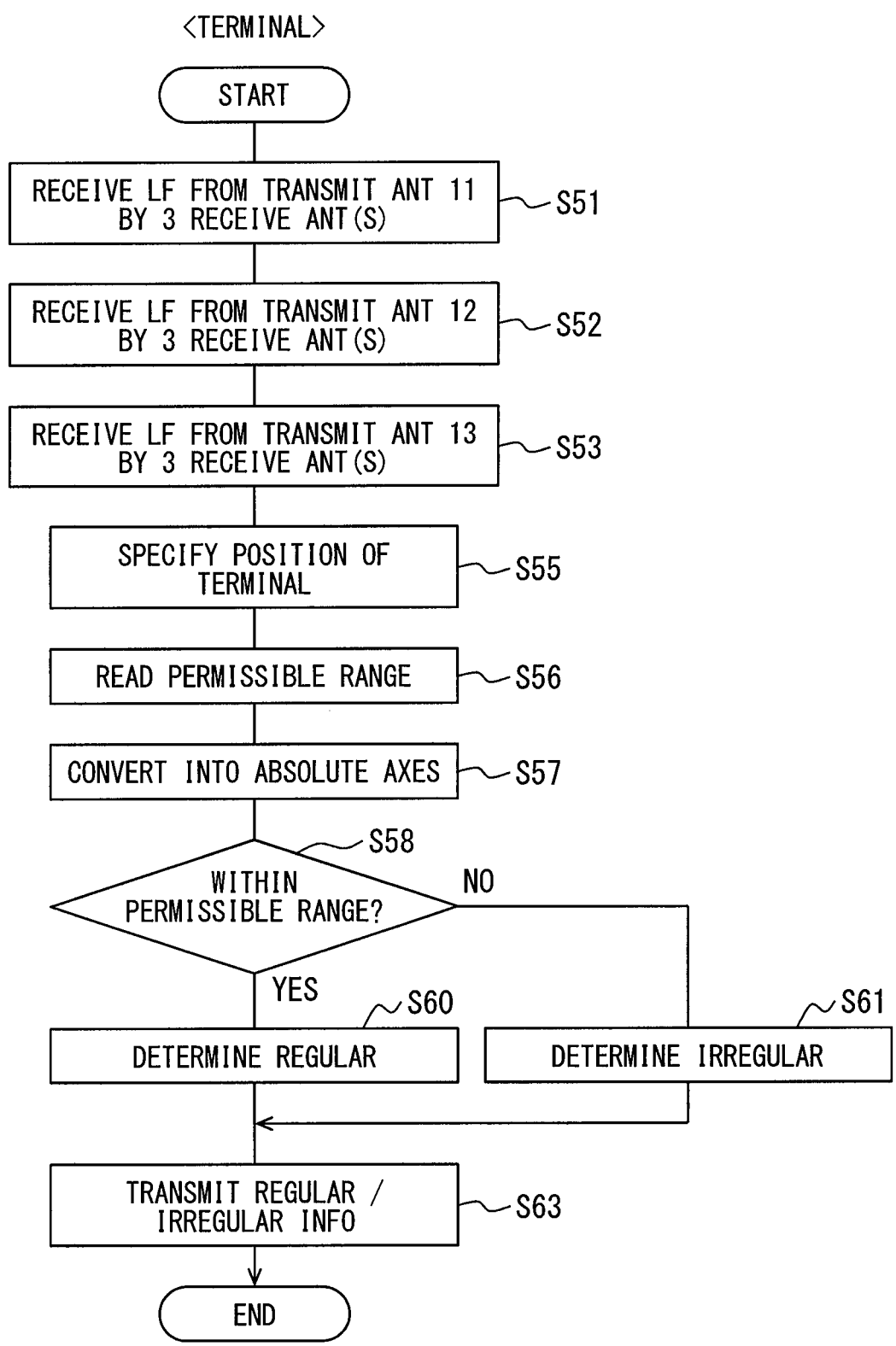
FIG. 12 is a flowchart of a process in a portable terminal of the vehicle system.

As shown in FIG. 12, in the process executed by the control circuit 60 in the portable terminal 50, after S51 to S53 similar to the processing shown in FIG. 5 are executed, the processing in S55 to S61 is executed similarly to S15 to S21 in the processing shown in FIG. 4. More specifically, in S55, by comparing the magnetic field intensities of each of the three axes acquired by the processing of S51 to S53 for each radio wave received from the transmission antennas 11, 12, 13, the processing to specify the position of the portable terminal 50 relative to the vehicle C is executed. In S56, the permissible range of the magnetic field intensity of each axis corresponding to the position specified in S55 is read from the ROM in the control circuit 60.

In the following S57, the magnetic field intensity of each of the three axes acquired by the processing of S51 to S53 is converted into the magnetic field intensity with respect to each axis of the absolute axis system based on the tilt information acquired via the tilt detector unit 65. Then, in S58, it is determined whether or not the magnetic field intensities with respect to each axis after the conversion are within the permissible range read in S56. When they are within the permissible range read in S56, it is determined to be regular in S60; when it is out of the permissible range, it is determined to be irregular in S61. In S63 subsequent to S60 or S61, the determination result in S60 or S61 is transmitted as the irregularity presence/absence information via the transmission antenna 54, and the process is temporarily ended.

In the above-mentioned S34, the irregularity presence/absence information transmitted in this way is received via the reception antenna 14. The irregularity presence/absence information received via the reception antenna 14 is applied, by the control circuit 20, to the various known controls such as control to prohibit or permit door locking and unlocking, control to prohibit or permit startup of the vehicle. In the process of FIG. 12, the processing of S55 is the processing as the position detector section 61, and the processing of S58, S60, S61 is the processing as the irregularity determiner section 62.

[2-3. Effect]

According to the second embodiment detailed above, in addition to the effects (1A) and (1B) of the above-described first embodiment, the following effects can be obtained.

(2A) In the present embodiment, the process executed by the in-vehicle apparatus 10 is simpler than the process executed by the portable terminal 50. Therefore, the processing load of the control circuit 20 in the in-vehicle apparatus 10 can be reduced, and other processing related to the vehicle C can be speeded up.

In the second embodiment, the respective elements or components may be differently referred to as follows. The position detector section 61 may be also referred to as a position controller or a position detector. The tilt detector unit 65 may also referred to as an orientation detector unit, an orientation detector circuit, or an orientation detector. The irregularity determiner section 62 may also referred to as a controller. The irregularity determiner section 62 and the position detector section 61 may referred to as a determiner section or a controller. The receiver unit 56 may be also referred to as an intensity acquirer unit or an in-terminal receiver. The transmitter unit 57 may be also referred to as a result transmitter unit or an in-terminal transmitter.

3. Third Embodiment

[3-1. Difference from First Embodiment]

Since the basic configuration of a third embodiment is the same as that of the first embodiment, the description of the common configuration will be omitted, and the difference will be mainly described. Note that the same reference signs as those in the first embodiment indicate the same configuration, and refer to the preceding descriptions.

Figure 13:
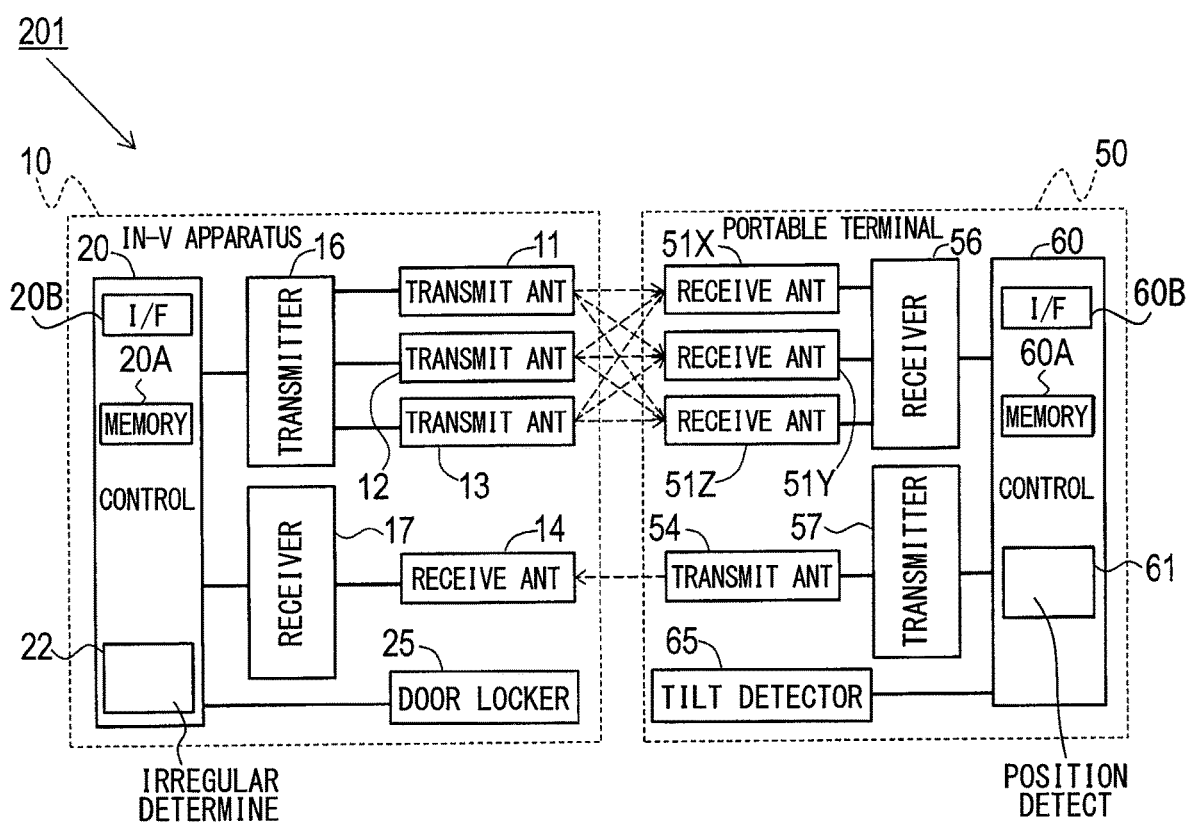
FIG. 13 is a block diagram showing a configuration of a vehicle system according to a third embodiment.

In the first embodiment described above, the position detector section 21 and the irregularity determiner section 22 are provided in the control circuit 20 of the in-vehicle apparatus 10. On the other hand, in the third embodiment, as shown in FIG. 13, the control circuit 60 in the portable terminal 50 is different from the first embodiment in that a position detector section 61 is provided.

[3-2. Processes]

Figure 14:
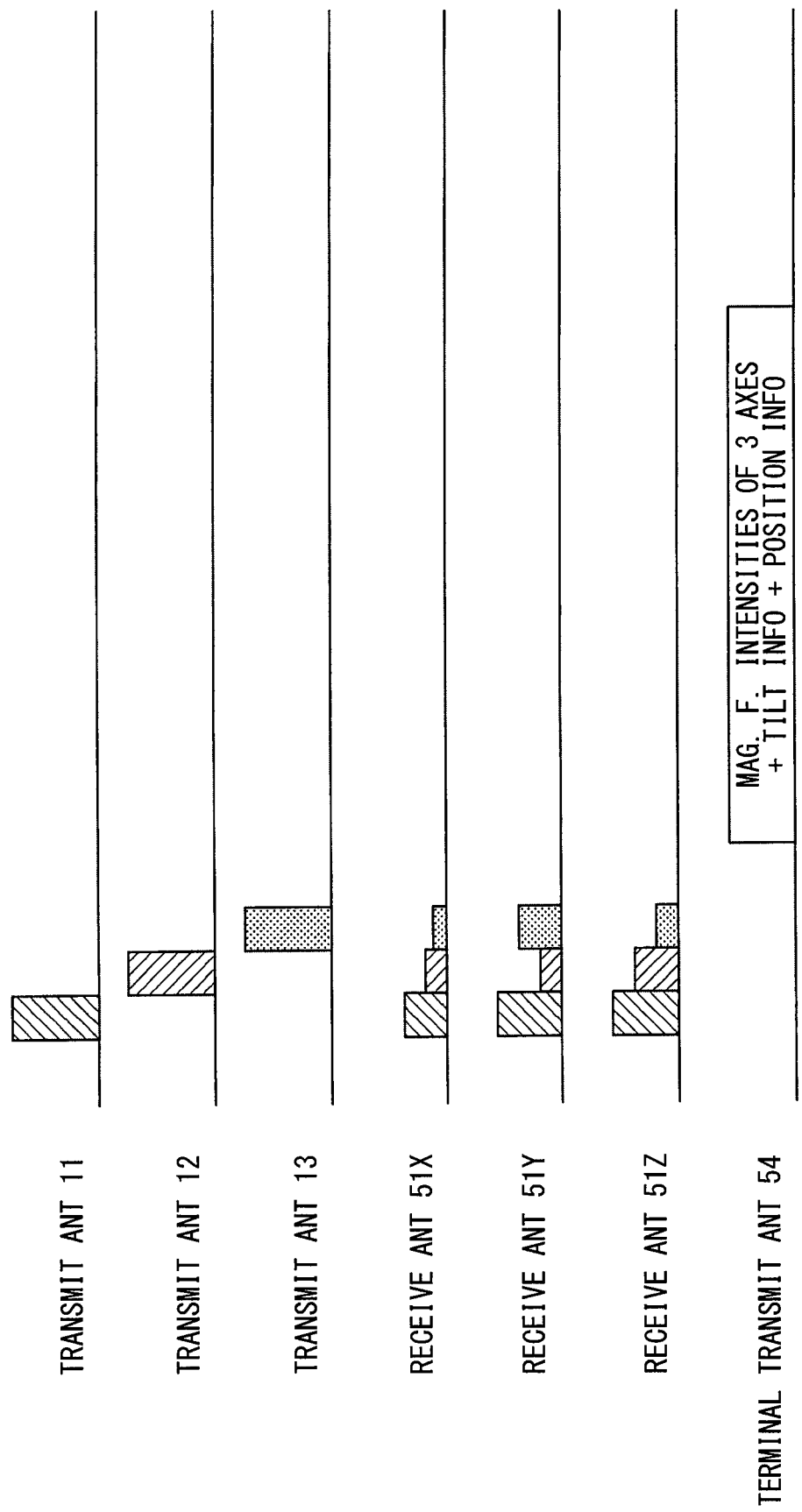
FIG. 14 is a time chart showing an operation of the vehicle system.

Therefore, in the vehicle system 201 according to the present embodiment, as in the second embodiment, the position detector section 61 in the control circuit 60 compares the magnetic field intensities of the radio waves received from the transmission antennas 11, 12, 13, thereby specifying the position of the portable terminal 50 with respect to the vehicle C. As shown in FIG. 14, in the same way as in the first embodiment, the magnetic field intensities of each of the three axes and the tilt information are simultaneously transmitted from the transmission antenna 54 to the reception antenna 14, and the position information (i.e., the information representing the position) is also transmitted. Therefore, in the control circuit 20, it is possible to determine the presence or absence of irregularity by executing the process in which S15 is omitted in FIG. 4. That is, the process in the control circuit 20 includes S18, S20, S21 which are processes as the irregularity determiner section 22.

[3-3. Effect]

According to the third embodiment detailed above, in addition to the effects (1A) and (1B) of the above-described first embodiment, the following effects are obtained.

(3A) The present embodiment does not apply processing load biased toward either the control circuit 20 of the in-vehicle apparatus 10 or the control circuit 60 of the portable terminal 50. For this reason, it is possible to prolong the battery of the portable terminal 50, and to speed up other processes related to the vehicle C by the control circuit 20.

In the third embodiment, the respective elements or components may be differently referred to as follows. The position detector section 61 may be referred to as a position controller or a position detector. The tilt detector unit 65 may be also referred to as an orientation detector unit, an orientation detector circuit, or an orientation detector. The irregularity determiner section 22 may be also referred to as a determiner section or a controller. The receiver unit 56 may be also referred to as an intensity acquirer unit or an in-terminal receiver. The receiver unit 17 may be also referred to as an information receiver unit or an in-vehicle receiver. The transmitter unit 57 may be also referred to as an information transmitter unit or an in-terminal transmitter.

4. Fourth Embodiment

[4-1. Difference from First Embodiment]

Since the basic configuration of a fourth embodiment is the same as that of the first embodiment, the description of the common configuration will be omitted, and the difference will be mainly described. Note that the same reference sign as those in the first embodiment indicate the same configuration, and refer to the preceding descriptions. This embodiment can be implemented in the vehicle system 1 configured similarly to the first embodiment.

Figure 15:
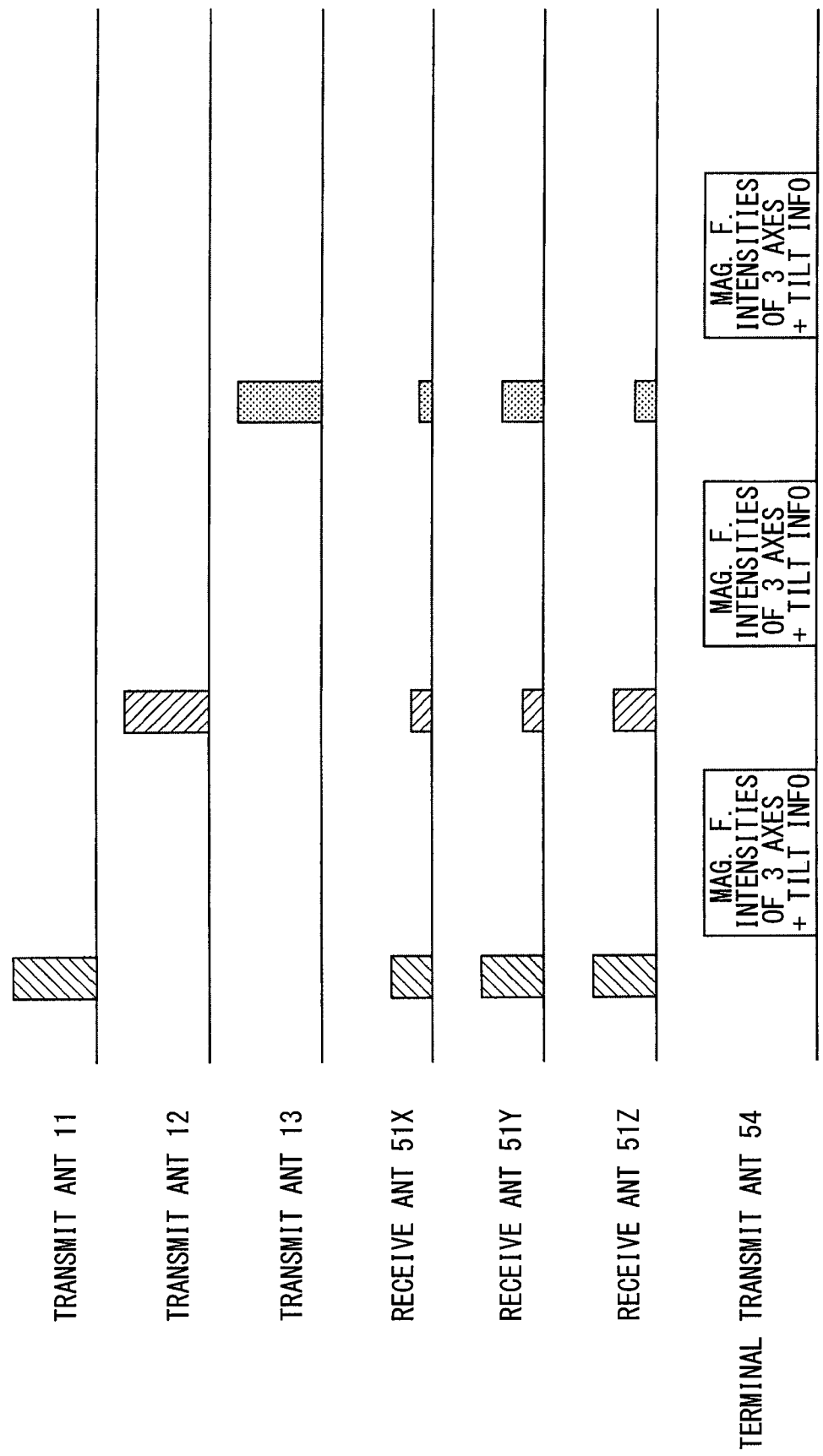
FIG. 15 is a time chart showing an operation of the vehicle system according to a fourth embodiment.

In the first embodiment described above, the magnetic field intensities of the three axes transmitted from the transmission antennas 11 to 13 are collectively transmitted as nine magnetic field intensities in S54. On the other hand, the fourth embodiment is different from the first embodiment in the following. That is, as shown in FIG. 15, each time a radio wave transmitted from the transmission antenna 11, 12 or 13 is received, the magnetic field intensity of each of the three axes associated with the received radio wave is transmitted along with the tilt information acquired at that time.

[4-2. Effect]

According to the fourth embodiment, in addition to the effects (1A), (1B), and (1C) of the first embodiment described above, the following effects can be obtained.

(4A) In the present embodiment, each time a radio wave transmitted from the transmission antenna 11, 12 or 13 is received, the magnetic field intensity of each of the three axes related to the received radio wave is transmitted together with the tilt information acquired at the time. Therefore, even if the transmission interval of the radio waves from the respective transmission antennas 11, 12, 13 is long and the information (that is, tilt information) representing the orientation of the portable terminal 50 changes during that time, the irregularity presence/absence can be determined while considering the change in the orientation.

5. Fifth Embodiment

[5-1. Difference from Second Embodiment]

Since the basic configuration of a fifth embodiment is the same as that of the second embodiment, the description of the common configuration will be omitted, and the difference will be mainly described. Note that the same reference signs as those in the second embodiment indicate the same configuration, and refer to the preceding descriptions. This embodiment can be implemented in the vehicle system 101 configured similarly to the second embodiment.

Figure 16:
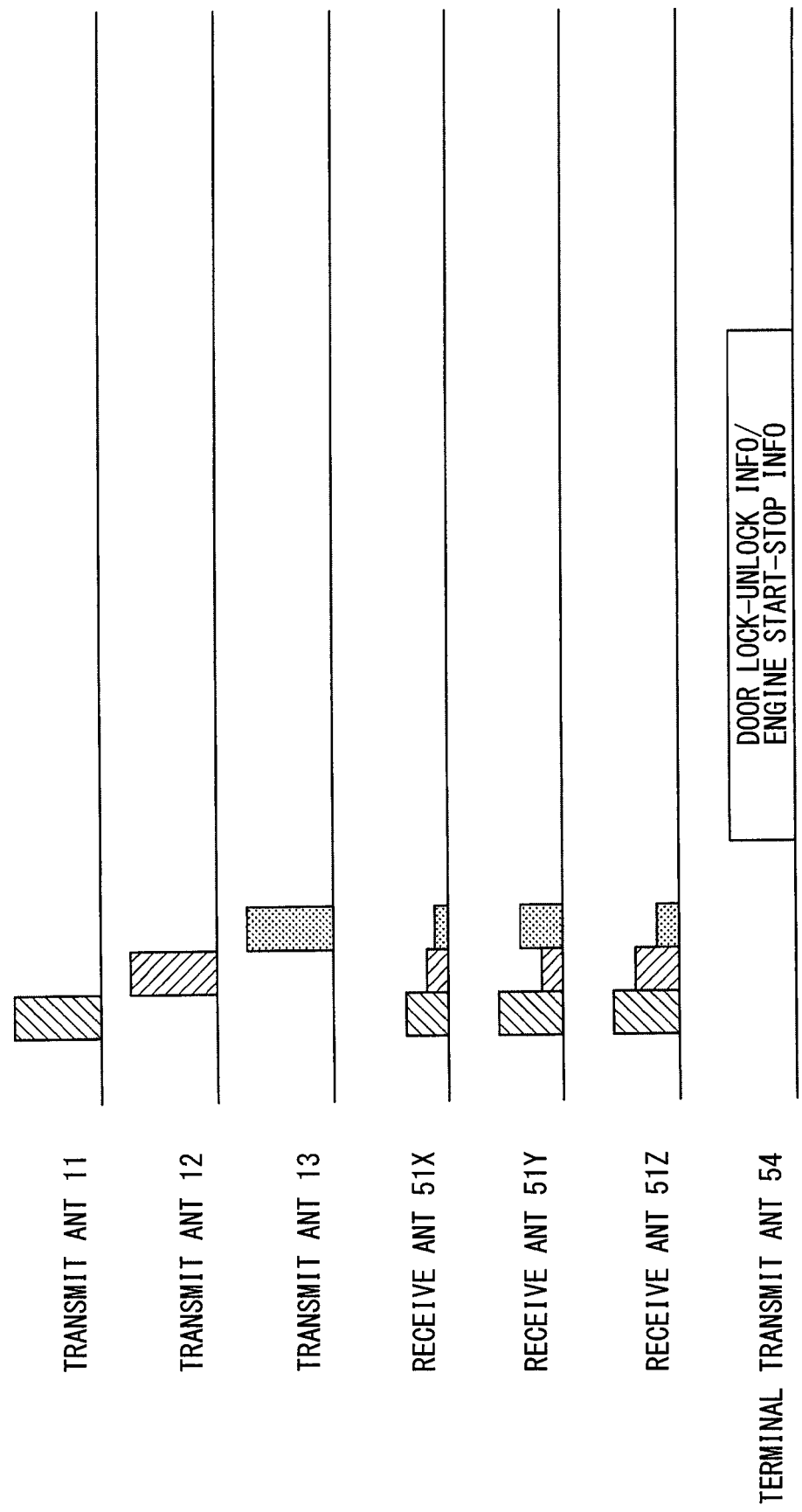
FIG. 16 is a time chart showing an operation of the vehicle system according to a fifth embodiment.

In the above-described second embodiment, the irregularity presence/absence information is transmitted from the transmission antenna 54. In contrast, the fifth embodiment is different from the second embodiment in that, as shown in FIG. 16, the locking/unlocking information of the door or the engine start/stop information is transmitted according to the irregularity presence or absence from the transmission antenna 54. The locking/unlocking information is information indicating whether or not to permit locking or unlocking of the door. In addition, the engine start/stop information is information for stopping (i.e., prohibiting) startup of the engine. The control circuit 60 in the present embodiment transmits door locking/unlocking information for prohibiting locking/unlocking of the door when it is irregular based on the determination result of the irregularity determiner section 62. When the determination result of the irregularity determiner section 62 is regular, the door locking/unlocking information that permits locking/unlocking of the door is transmitted. This also applies to the engine start/stop information.

[5-2. Effect]

According to the fifth embodiment detailed above, in addition to the effects (1A) and (1B) of the first embodiment described above and the effect (2A) of the second embodiment, the following effects can be obtained.

(5A) In the present embodiment, it is unnecessary for the control circuit 20 in the in-vehicle apparatus 10 to execute the process of generating locking/unlocking information or the like based on the irregularity presence/absence information. Therefore, the processing load of the control circuit 20 can be further reduced, and other processes related to the vehicle C can be further speeded up.

In the fifth embodiment, the respective elements or components may be differently referred to as follows. The position detector section 61 may be also referred to as a position controller or a position detector. The tilt detector unit 65 may be also referred to as an orientation detector unit, an orientation detector circuit, or an orientation detector. The irregularity determiner section 62 may be also referred to as a controller. The irregularity determiner section 62 and the position detector section 61 may collectively referred to as a determiner section or a controller. The receiver unit 56 may be also referred to as an intensity acquirer unit or an in-terminal receiver. The transmitter unit 57 may be also referred to as an instruction transmitter unit or an in-terminal transmitter.

6. Sixth Embodiment

[6-1. Difference from First Embodiment]

Since the basic configuration of a sixth embodiment is the same as that of the first embodiment, the description of the common configuration will be omitted, and the difference will be mainly described. Note that the same reference signs as those in the first embodiment indicate the same configuration, and refer to the preceding descriptions.

In each of the above embodiments, the three transmission antennas 11 to 13 are provided in the vehicle C, but the present disclosure is not limited thereto. The position in the Z axis direction of the portable terminal 50 with respect to the vehicle C (that is, the position in the vertical direction) does not change much. Therefore, ignoring the position in the Z-axis direction, almost the same control as in each of the above embodiments can be executed by providing only two transmission antennas in the vehicle C.

Figure 17:
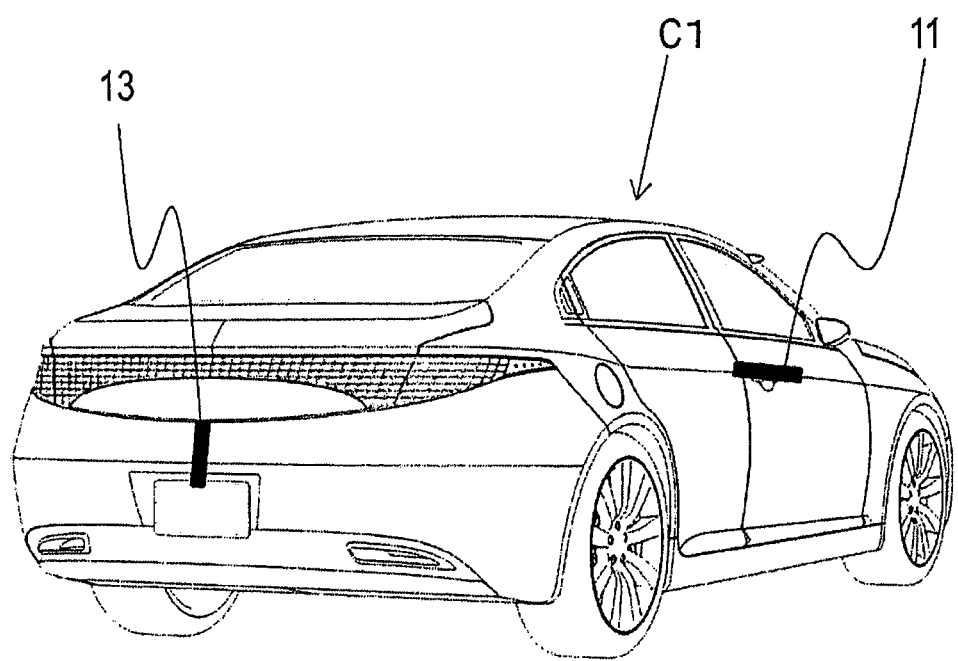
FIG. 17 is a schematic diagram showing an antenna arrangement of a vehicle according to a sixth embodiment.
Figure 18:
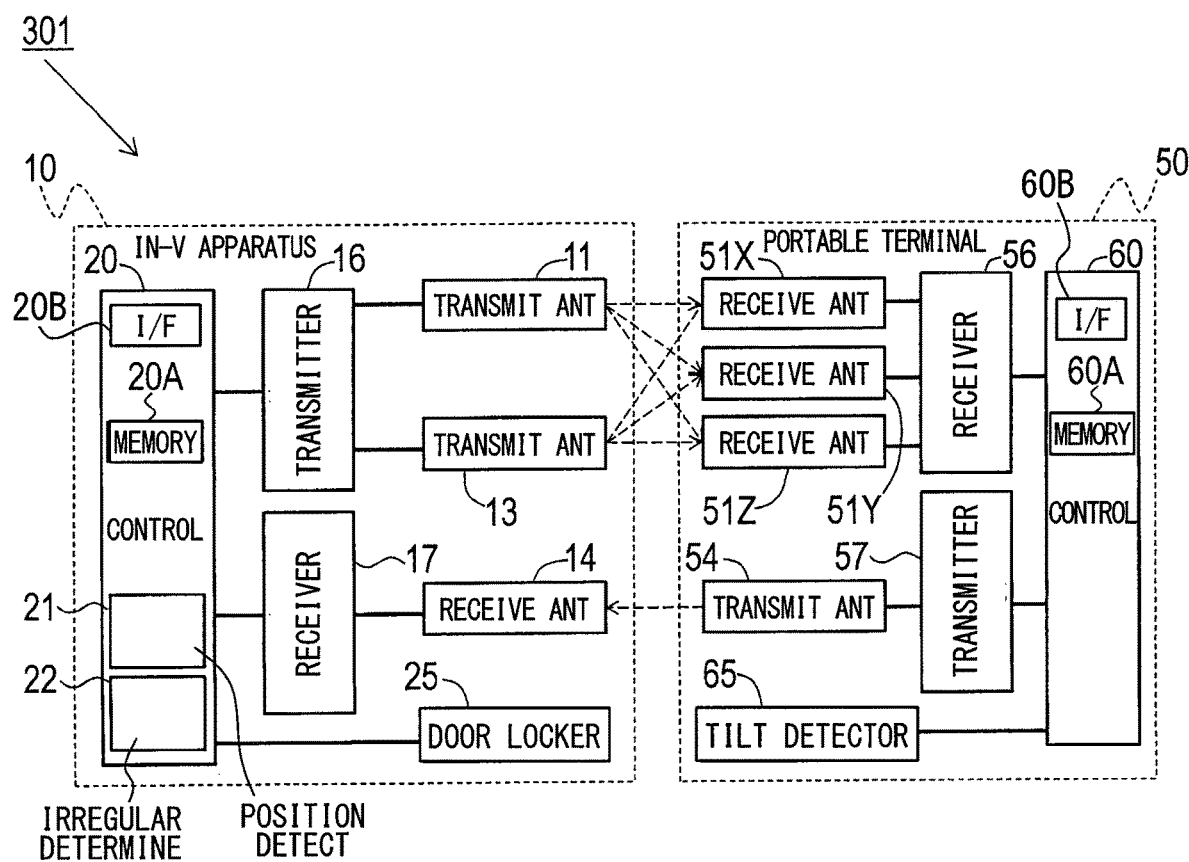
FIG. 18 is a block diagram showing a configuration of a vehicle system according to the sixth embodiment.

The vehicle C1 shown in FIG. 17 is different from the vehicle C in that the transmission antenna 12 on the left front side is omitted. Further, the transmission antenna 11 is arranged so as to have an axis in a substantially horizontal direction. The transmission antenna 13 is arranged so as to have an axis in a substantially vertical direction. As shown in FIG. 18, the vehicle system 301 according to the present embodiment is configured similarly to the vehicle system 1 of the first embodiment, except that the transmission antenna 12 is omitted. Note that the substantially horizontal direction and the substantially vertical direction do not have to be completely horizontal or vertical, respectively, and may be deviated by about ±10 degrees.

The processing executed by the control circuit 20 and the control circuit 60 is the same as that of the first embodiment except that the processing related to the transmission antenna 12 is omitted. More specifically, S12 of the process in the control circuit 20 shown in FIG. 4 is omitted, and S52 of the process in the control circuit 60 shown in FIG. 5 is omitted.

Also, in S54, the magnetic field intensities of each of the three axes related to the two reception time points and the tilt information are transmitted. In addition, the determination in S18 is made using, for example, 1-$x$, 1-$y$, 1-$z$, 3-$x$, 3-$y$, 3-$z$ shown in FIG. 8.

In the present embodiment, it is assumed that the receiver unit 56 of the portable terminal 50 can detect the phase of each radio wave. In other words, the instantaneous intensities of the radio waves transmitted by the transmission antennas 11, 13 change in sinusoidal wave form to switch the direction; in contrast, the receiver unit 56 can detect the switched direction as well. Such a function can be realized by, for example, providing a clock synchronized between the in-vehicle apparatus 10 and the portable terminal 50 as described above, or by other methods. In that case, in the example of FIG. 8, even though the absolute values are the same but the signs of the radio waves in the regular state and the irregular state are exchanged between positive and negative, it is possible to detect the difference between the regular state and the irregular state.

[6-2. Effect]

According to the sixth embodiment described above, in addition to the effects (1A) to (1C) of the above-described first embodiment, the following effects can be obtained.

(6A) In the present embodiment, since it is only necessary to provide two transmission antennas 11, 13 in the vehicle C1, the manufacturing cost as a whole of the vehicle system 301 is reduced. In addition, since the processing related to the transmission antenna 12 is omitted, the processing load of the control circuits 20 and 60 can also be reduced. In particular, by reducing the processing load in the control circuit 60, the battery of the portable terminal 50 can be further prolonged.

Figure 19:
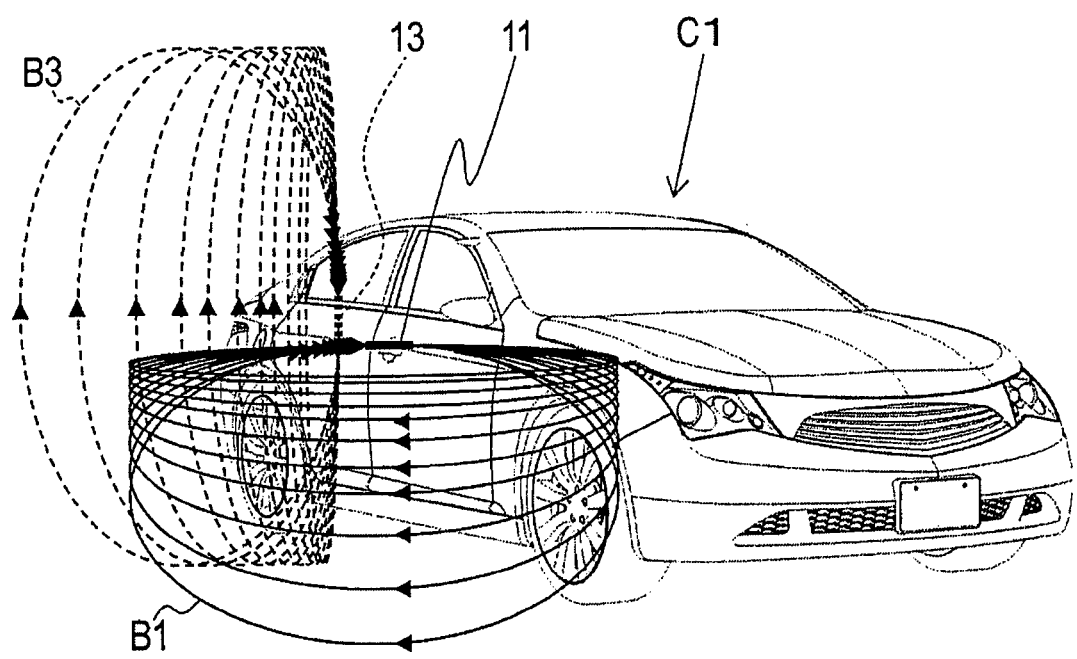
FIG. 19 is an explanatory diagram showing magnetic fields formed by radio waves from antennas of the vehicle according to the sixth embodiment.

(6B) In the present embodiment, the transmission antenna 11 is arranged so as to have an axis in a substantially horizontal direction; the transmission antenna 13 is arranged so as to have an axis in a substantially vertical direction. Therefore, in the vicinity of the vehicle C1, the magnetic field B1 formed by the radio wave from the transmission antenna 11 and the magnetic field B3 formed by radio wave from the transmission antenna 13 are orthogonal to each other at many positions having some heights over the ground, as shown in FIG. 19. This configuration may suppress the magnetic field intensities 1-$x$, 1-$y$, 1-$z$, 3-$x$, 3-$y$, 3-$z$ from coinciding between the regular state and the irregular state, as described in the above. In other words, if the number of transmission antennas is simply reduced, the probability of coincidence as described above increases; however, in the present embodiment, it is suppressed by making the magnetic field directions orthogonal to each other, as described above.

Hereinafter, this point will be described with reference to FIG. 20. In the following description, for the sake of convenience, the case where the two transmission antennas 11 and 13 are orthogonal to each other on the XY plane will be described, but as shown in FIG. 19, the case where the transmission antennas 11, 13 are orthogonal to each other on the XZ plane can be thought similarly. In the irregular reception example shown in FIG. 20, similarly to the case of FIG. 7, the repeaters are respectively disposed at a point P1 and a point P3. The point P1 is about 50 cm away from the vehicle C1 in the +Y direction; the point P3 is about 50 cm away in the −Y direction from a point P2 where the portable terminal 50 is disposed. Then, it is assumed that the same radio wave as the radio wave received at the point P1 is transmitted from the point P3.

Figure 20:
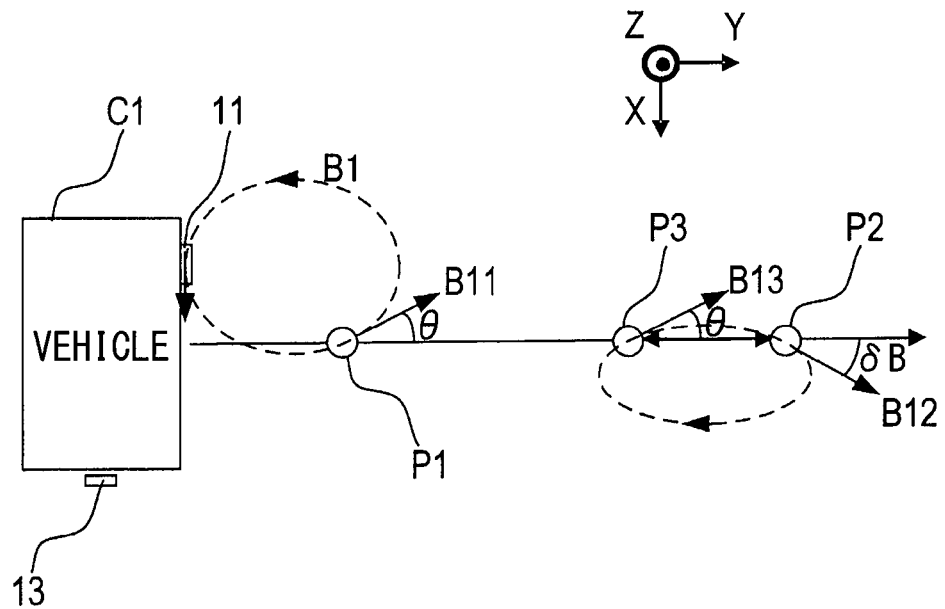
FIG. 20 is an explanatory diagram showing a magnetic field direction of an irregular reception example relating to one antenna.

In the example of FIG. 20, it is assumed that a magnetic field B1 is formed by the radio wave from the transmission antenna 11, and its intensity (i.e., magnitude) and direction are represented by a vector B11 at the point P1. The magnetic field represented by the vector B13, which is parallel to the vector B11 with the same length as the vector B11, is formed at the point P3. Due to the magnetic field B13, the magnetic field represented by the vector B12 is formed at the point P2.

Let $\theta$ be the angle the vector B11 (B13) forms against the Y axis on the XY plane. Let $\delta B$ be the angle the vector B12 forms against the Y axis on the XY plane. If $\theta$ is variously changed, there is arising a unique state in which the difference between $\theta$ and $\delta B$ is within the angular difference corresponding to the above-mentioned permissible range. Such a unique state involves a possibility of failing to distinguish between a regular state and an irregular state.

Figure 21:
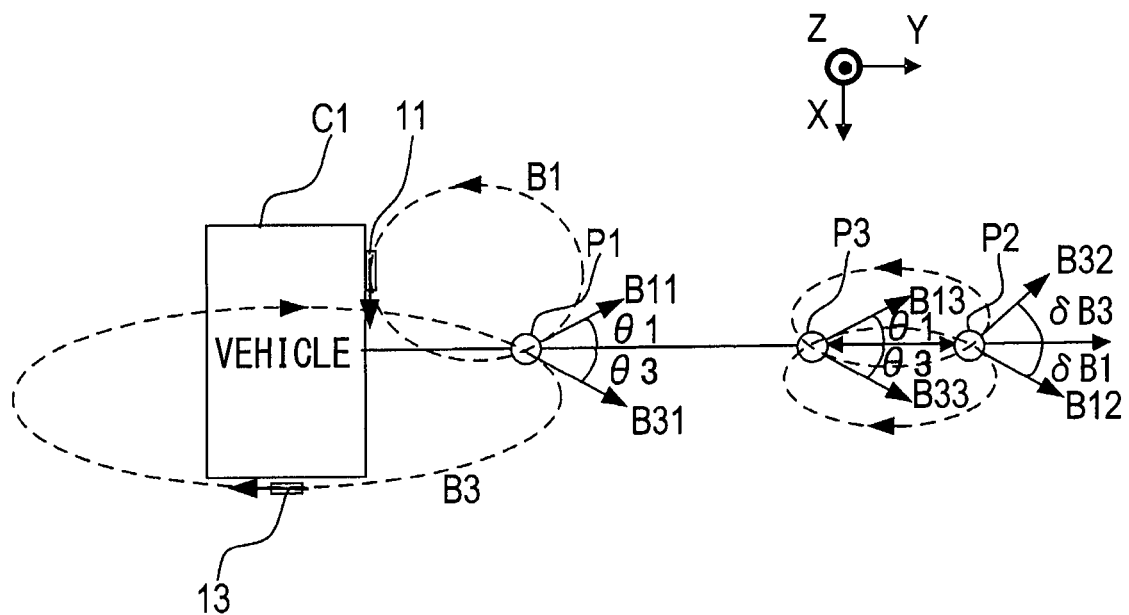
FIG. 21 is an explanatory diagram showing a magnetic field direction of an irregular reception example relating to two antennas.

If two transmission antennas are provided as in the present embodiment, for example, as shown in FIG. 21, it is possible to distinguish between the regular state and the irregular state with respect to two kinds of electric fields, thereby decreasing a possibility of generating the above unique state. Specifically, in addition to the magnetic field B1 in the example of FIG. 20, the magnetic field B3 is formed by radio waves from the transmission antenna 13 to provide its magnitude and direction represented by the vector B31 at the point P1. The magnetic field represented by the vector B33, which is parallel to the vector B31 with the same length as the vector B31, is formed at the point P3. Due to the magnetic field B33, the magnetic field represented by the vector B32 is formed at the point P2. Let $\theta 1$ be the angle the vector B11 (B13) forms against the Y axis on the XY plane. Let $\delta B1$ be the angle the vector B12 forms against the Y axis on the XY plane. Let $\theta 3$ be the angle the vector B31 (B33) forms against the Y axis on the XY plane. Let $\delta B3$ be the angle that vector B32 forms against the Y axis on the XY plane.

This case reduces the probability that the difference between $\theta 1$ and $\delta B1$ is within the angular difference corresponding to the above-mentioned permissible range and, simultaneously, the difference between $\theta 3$ and $\delta B3$ is within the angular difference corresponding to the above-mentioned permissible range. In addition, from a general electromagnetic calculation, when the angle $\theta 1 - \theta 3 = 90$ degrees, such probability is minimized; in contrast, when $\theta 1 - \theta 3 = 0$ degree, such a probability is maximized. When $\theta 1 - \theta 3 = 0$ degree, that is, when the magnetic fields B1, B3 are parallel, as in the case where only one transmission antenna is provided, the probability that the angle difference is within the angular difference corresponding to the permissible range is increased. In the present embodiment, since the magnetic fields B1 and B3 are perpendicular to each other, it is possible to satisfactorily discriminate between a regular state and an irregular state.

7. Seventh Embodiment

[7-1. Difference from Sixth Embodiment]

Since the basic configuration of a seventh embodiment is the same as that of the sixth embodiment, a description of the common configuration will be omitted, and differences will be mainly described. Note that the same reference signs as those in the sixth embodiment indicate the same configuration, and refer to the preceding descriptions. In the sixth embodiment, the receiver unit 56 is capable of detecting the phase of radio waves, but in the present embodiment, it is different in that the receiver unit 56 cannot detect the phase of radio waves and the process in the control circuits 20, 60 is different from the sixth embodiment as described below.

In the case where the phase of the radio wave cannot be detected as in the present embodiment, it is possible to detect the difference in sign of the magnetic field intensity of the simultaneously received radio waves, such as 1-$x$, 1-$y$, 1-$z$ in FIG. 8. However, it is not possible to detect the different in signs (that is, the direction of the arrow representing the vector of the magnetic field) related to the magnetic field intensities received at different time points, such as 1-$x$ and 2-$x$. In that case, the probability that the magnetic field intensities 1-$x$, 1-$y$, 1-$z$, 3-$x$, 3-$y$, 3-$z$ coincide with each other in both the regular state and the irregular state is increased not only in the case that a difference between $\theta 1$ and $\theta 3$ is 0 degree, but also in the case that such a difference is 90 degrees. From a general electromagnetic calculation, in cases that the phase of the radio wave cannot be detected, if $\theta 1 - \theta 3 = 45 (2n+1)$ degrees, the probability can be minimized. Here, n is an integer of 0 (zero) or more.

Figure 22:
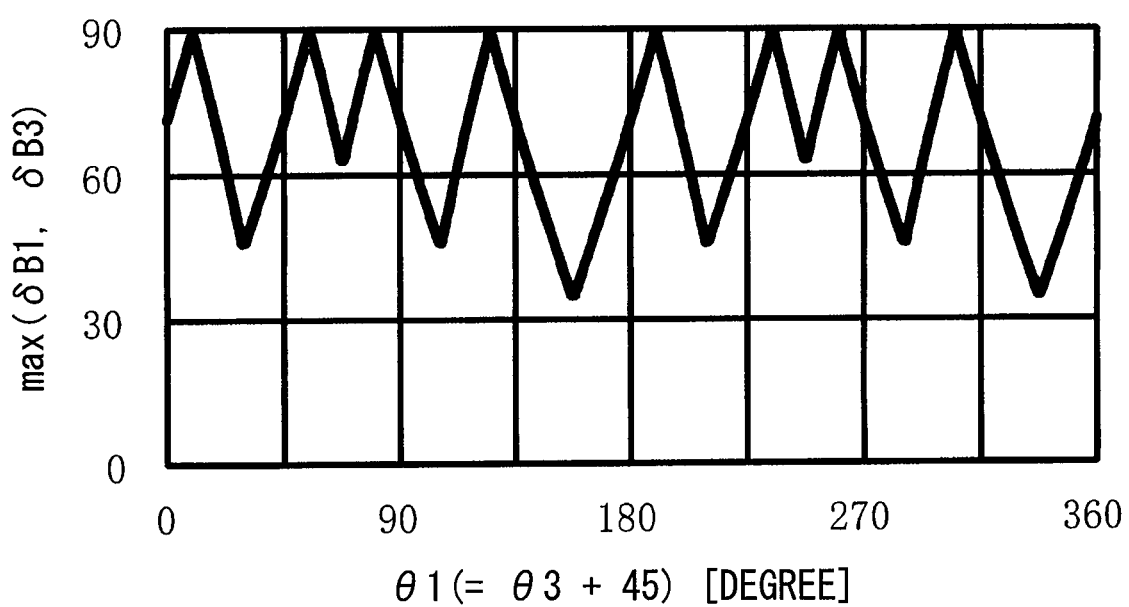
FIG. 22 is an explanatory diagram showing an effect of a reception example under θ1−θ3=45 degrees.

FIG. 22 is a graph showing the change of max ($\delta B1$, $\delta B3$) in the case where $\theta 1$ (that is, $\theta 3+45$ degrees) is variously changed so as to be $\theta 1 - \theta 3 = 45$ degrees in FIG. 21. In addition, max ($\delta B1$, $\delta B3$) indicates $\delta B$ or $\delta B3$, whichever is larger.

As shown in FIG. 22, if $\theta 1 - \theta 3 = 45$ degrees, max ($\delta B1$, $\delta B3$) is 30 degrees or more irrespective of the value of $\theta 1$. Therefore, in this case, it is possible to reduce the probability that the magnetic field intensities 1-$x$, 1-$y$, 1-$z$, 3-$x$, 3-$y$, 3-$z$ happen to coincide in a regular state and an irregular state.

Therefore, in the present embodiment, the radio waves are transmitted from both transmission antennas 11, 13 as necessary as described below. This makes it possible to satisfactorily perform the determination as to whether the regular state or the irregular state takes place as described above.

[7-2. Process]

Figure 23:
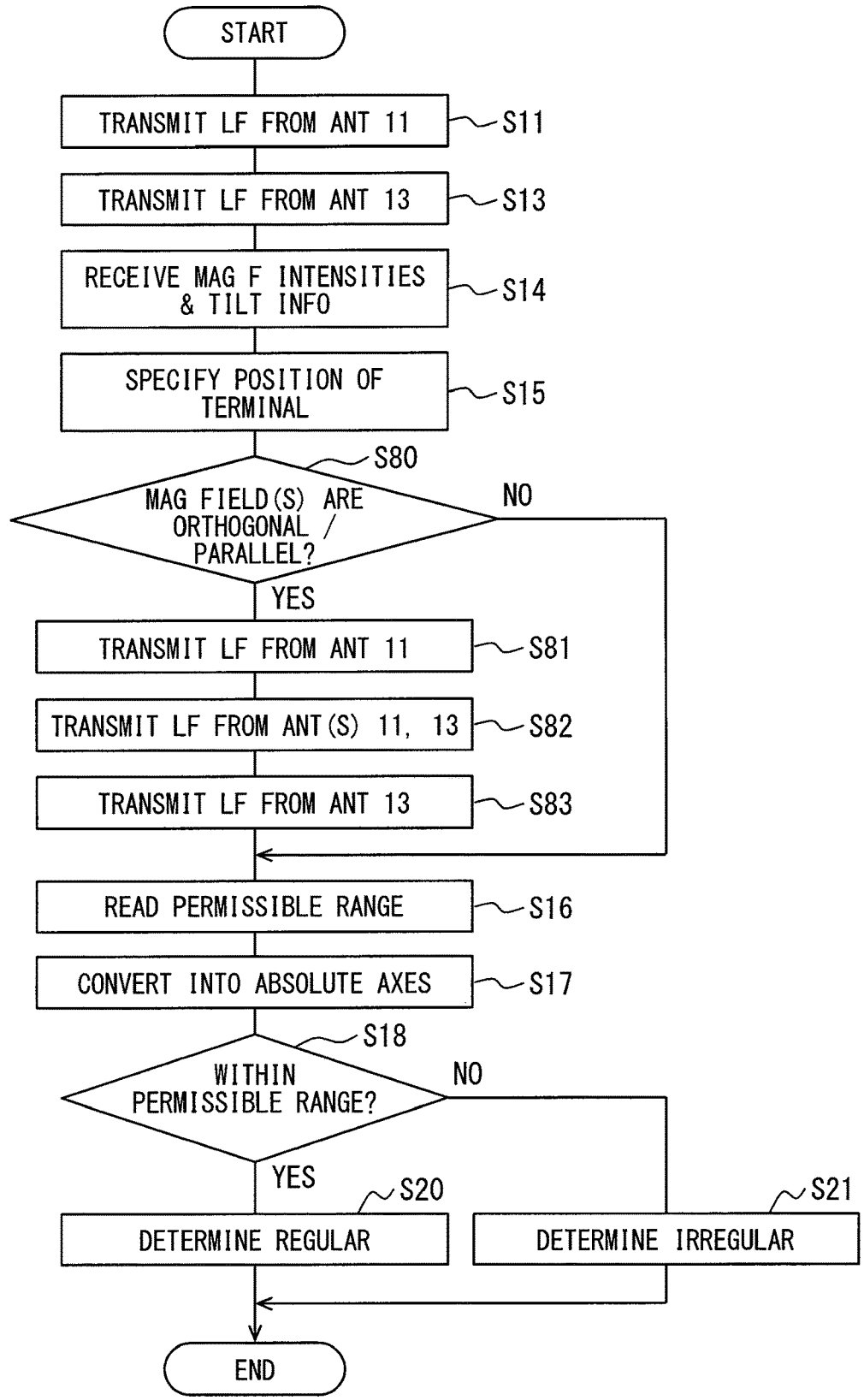
FIG. 23 is a flowchart of a process in an in-vehicle apparatus of a vehicle system according to a seventh embodiment.

In the present embodiment, as shown in FIG. 23, the process executed by the control circuit 20 is different from that of the first embodiment shown in FIG. 4 in that (i) S12 is omitted and (ii) S80 to S83 are inserted between S15 and S16, while the other processing is the same. Though not shown, the point that S12 is omitted by omitting the transmission antenna 12 is the same as in the sixth embodiment.

As shown in FIG. 23, the position of the portable terminal 50 is specified in S15. In subsequent S80, it is determined whether or not the magnetic field due to the radio wave from the transmission antenna 11 and the magnetic field due to the radio wave from the transmission antenna 13 are either orthogonal or parallel to each other. If the magnetic fields are neither orthogonal nor parallel, a negative determination is made in S80 and the process proceeds to S16 described above. In this case, the processing is the same as in the sixth embodiment.

On the other hand, when the magnetic field due to the radio wave from the transmission antenna 11 and the magnetic field due to the radio wave from the transmission antenna 13 are either orthogonal or parallel at the position of the portable terminal 50, an affirmative determination is made in S80, and the process proceeds to S81. In the present embodiment, as described above, the transmission antenna 11 is arranged so as to have an axis in a substantially horizontal direction, and the transmission antenna 13 is arranged so as to have an axis in a substantially vertical direction. Therefore, in the case where an affirmative determination is made in S80, in most cases, the magnetic field due to the radio wave from the transmission antenna 11 and the magnetic field due to the radio wave from the transmission antenna 13 are orthogonal to each other.

In S81, as in S11, the transmission of radio wave in LF band is executed by the transmission antenna 11. In subsequent S82, the respective transmissions of radio waves in LF band by the transmission antenna 11 and the transmission antenna 13 are executed in synchronization with each other. By this processing, the magnetic field due to the radio wave from the transmission antenna 11 and the magnetic field due to the radio wave from the transmission antenna 13 are combined at the position of the portable terminal 50. This forms a magnetic field that is neither orthogonal nor parallel to each of the magnetic field due to the radio wave from the transmission antenna 11 and the magnetic field due to the radio wave from the transmission antenna 13. In subsequent S83, similarly to S13, the transmission of the radio wave in LF band is executed by the transmission antenna 13; then, the process proceeds to S16 described above.

Figure 24:
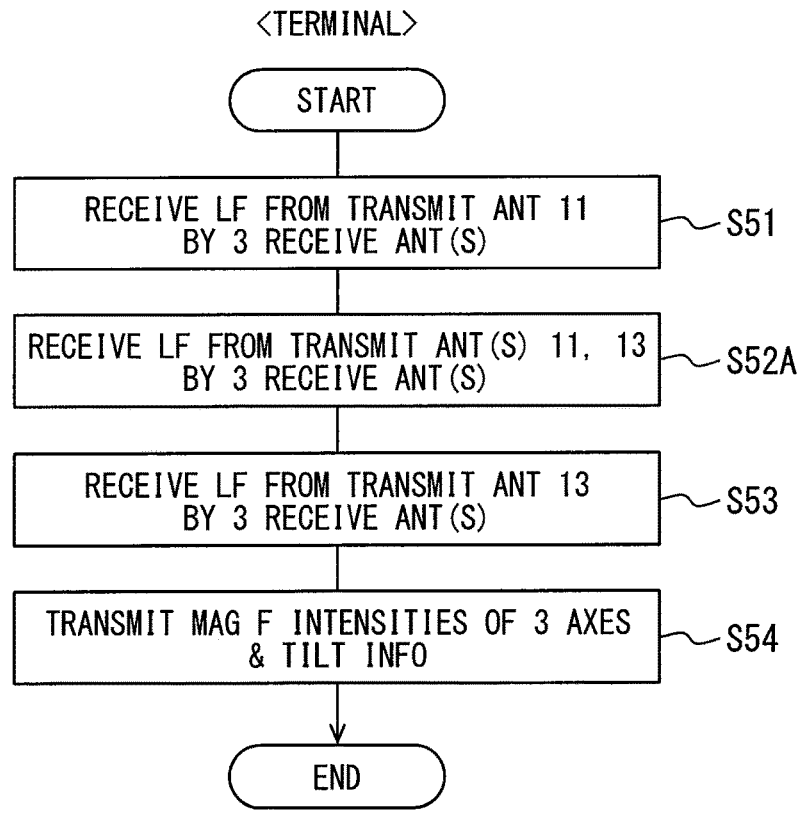
FIG. 24 is a flowchart of a process in a portable terminal of the vehicle system according to the seventh embodiment.

Corresponding to the processing of S81 to S83, the control circuit 60 of the portable terminal 50 executes processing similar to the processing shown in FIG. 5, as shown in FIG. 24. That is, in S51, the radio wave in LF band transmitted from the transmission antenna 11 at the time point of S81 is received via the reception antennas 51X, 51Y, 51Z, individually. In S52A instead of S52, the radio waves in LF band transmitted from the transmission antennas 11, 13 at the time point of S82 are received via the reception antennas 51X, 51Y, 51Z, individually. In S53, the radio wave in LF band transmitted from the transmission antenna 13 at the time point of S83 is received via the reception antennas 51X, 51Y, 51Z, individually. Subsequently, in S54, the magnetic field intensities (i.e., the information on nine magnetic field intensities) in the respective axes of the received radio waves and the tilt information acquired via the tilt detector unit 65 are transmitted from the transmission antenna 54; then, the process is temporarily ended.

Then, in the processing of S16 to S18 in FIG. 23, the determination as to whether or not to be within a permissible range like in the first embodiment is performed, with respect to the nine magnetic field intensities of each of (i) the magnetic field intensities by the radio wave from the transmission antenna 11, (ii) the combined magnetic field intensities by the combined radio waves synchronized from the transmission antennas 11, 13, and (iii) the magnetic field intensities by the radio wave from the transmission antenna 13.

[7-3. Effect]

According to the seventh embodiment described above, in addition to the effects (1A) to (1C) of the above-described first embodiment, the following effects can be obtained.

(7A) In the present embodiment, since it is only necessary to provide two transmission antennas 11, 13 in the vehicle C1 and it is not necessary to detect the phase, the manufacturing cost of the vehicle system 301 as a whole is reduced. In addition, when the magnetic fields are not orthogonal, the processing related to the transmission antenna 12 is omitted as compared with the processing in the first embodiment, and the processing load on the control circuits 20 and 60 can also be reduced. In particular, by reducing the processing load in the control circuit 60, the battery of the portable terminal 50 can be further prolonged.

(7B) Further, in the present embodiment, all the magnetic fields due to the radio waves received by the portable terminal 50 at the respective time points S51 to S53 are neither parallel nor orthogonal. For this reason, it is possible to satisfactorily suppress coincidence of magnetic field intensities in the three axial directions received by the portable terminal 50 at each time point between the above-described regular state and irregular state. Therefore, it is possible to satisfactorily determine whether it is regular state or irregular state as described above.

Note that in S82 described above, the control circuit 20 may generate radio waves with the same power from the transmission antenna 11 and the transmission antenna 13, but may generate radio waves with mutually different powers. In particular, it is desired to set the power ratio between two powers to achieve the state where at the position where the portable terminal 50 is arranged, the combined magnetic field by the radio waves from the transmission antenna 11 and the transmission antenna 13 crosses the respective magnetic fields due to the radio waves from the transmission antennas 11, 13 at an angle of 45 degrees. In that case, it is possible to preferably determine whether it is in regular state or irregular state as described above, as in the case where θ1−θ3=45 degrees described above. In addition, there may be cases where the processing of either (i) S81 in FIG. 23 and S51 in FIG. 24, or (ii) S83 in FIG. 23 and S53 in FIG. 24 may be omitted.

8. Eighth Embodiment

[8-1. Difference from Sixth Embodiment]

Since the basic configuration of an eighth embodiment is the same as that of the sixth embodiment, the description of the common configuration will be omitted, and the difference will be mainly described. Note that the same reference signs as those in the second embodiment indicate the same configuration, and refer to the preceding descriptions. In the sixth embodiment and the seventh embodiment, radio waves are transmitted from a plurality of transmission antennas 11, 13 so that the direction of the magnetic field by each radio wave is differentiated. On the other hand, the present embodiment differs in that the direction of the magnetic field is movable by providing one transmission antenna 11 to be movably with respect to the vehicle C2.

Figure 25:
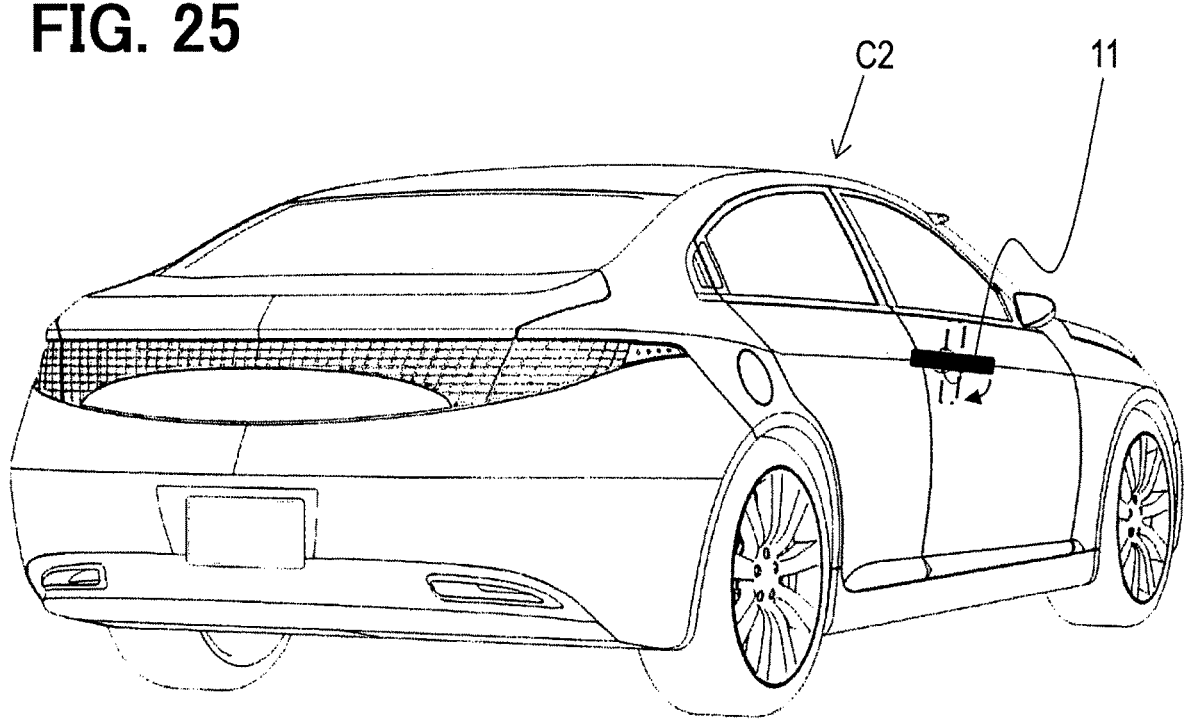
FIG. 25 is an explanatory diagram showing an antenna configuration of a vehicle according to an eighth embodiment.

As indicated by the arrow in FIG. 25, the transmission antenna 11 is provided to be rotatable around a rotation axis set along the vehicle width direction of the vehicle C2. In this case, the control circuit 20 is also connected to an actuator for rotating the transmission antenna 11. Then, the control circuit 20 changes the arrangement of the transmission antenna 11 at various different rotation angles, thereby transmitting the radio waves in corresponding different directions from the transmission antenna 11. If it is determined whether or not the radio waves received by the portable terminal 50 are within the permissible range as described above at the respective time points at which the transmission antenna 11 is arranged at various rotation angles, the determination as to whether it is in regular state or irregular state can be performed.

[8-3. Effects]

According to the eighth embodiment described above, in addition to the effects (1A) to (1C) of the above-described first embodiment, the following effects can be obtained.

(8A) In the present embodiment, it is sufficient to provide one transmission antenna 11 in the vehicle C1, and the manufacturing cost of the vehicle system 301 as a whole is further reduced satisfactorily. Note that the position of the portable terminal 50 may also be detected based on the radio waves received by the portable terminal 50 at the respective time points, or the position may be detected by other methods.

9. Other Embodiments

Although embodiments of the present disclosure have been described above, the present disclosure is not limited to the above-described embodiments, and various modifications can be made.

(9A) In each of the above-described embodiments, the reception antennas 51X to 51Z provided along three orthogonal axes are provided in the portable terminal 50, but the present invention is not limited thereto. For example, in cases that three axes along which the reception antennas are arranged are not on the same plane, even if they are not orthogonal to each other, such three axes may be converted to an absolute axis system as in each of the above embodiments. That is, it is possible to convert the magnetic field intensity of the radio wave received by the portable terminal 50 into the magnetic field intensity for each axis of the absolute axis system based on the tilt information and the magnetic field intensities of the radio waves received by the respective three reception antennas.

(9B) Further, the reception antenna may be a single antenna (that is, one axis) as long as it is movable so as to move (i.e. to change the angle of) the orientation of the antenna to thereby acquire the magnetic field direction of the radio wave and the magnetic field intensity. In that case, the above-described process may be executed based on (i) the solid angle in the magnetic field direction related to the radio wave received by the portable terminal 50 and (ii) the magnetic field intensity.

(9C) In the case where a transmission antenna provided in the vehicle C transmits a radio wave while moving inside the vehicle C (for example, along the outer peripheral surface of the vehicle C), providing even such a single movable transmission antenna to the vehicle C allows substantially the same control as in each of the above embodiments to be executed.

(9D) In each of the embodiments, the tilt detector unit 65 as an orientation acquirer section is provided in the portable terminal 50, but there is no need to be limited thereto. For example, the orientation of the portable terminal 50 may be detected by transmitting the radio waves from the antennas of three axes in the portable terminal 50 and receiving them with the antennas of three axes in the in-vehicle apparatus 10. In such a case, the tilt detector unit 65 may be included in a control circuit or controller provided in the in-vehicle apparatus 10 and may be achieved not by a hardware circuit that includes various well-known sensors such as a sensor having a level or an acceleration sensor, but by a software manner. That is, the tilt detector unit 65 provided either in the portable terminal 50 or the in-vehicle apparatus 10 may be achieved by using or by including (i) at least one hardware circuit including a sensor, analog circuit, and/or digital circuit, or (ii) at least one processing unit such as a CPU in a computer along with memory storing instructions executed by the CPU, or (iii) a combination of the at least one hardware circuit and the at least one processing unit along with memory storing instruction, to thereby provide the function.

(9E) In each of the above-described embodiments, the information representing the position of the portable terminal 50 with respect to the in-vehicle apparatus 10 is acquired based on the magnetic field intensities of the radio waves received from the transmission antennas 11, 12, and 13. There is however no need to be limited thereto. For example, the information representing the position of the portable terminal 50 with respect to the in-vehicle apparatus 10 may be acquired by capturing an image of the portable terminal 50 with a camera mounted to the vehicle C, or by another technique.

(9F) Further, in the case where the information representing the position is acquired by other methods irrespective of the radio waves from the transmission antennas, the vehicle C may be provided with a single transmission antenna regardless of whether it is movable or fixed. However, as in the above-described embodiments, it is preferable to provide a plurality of transmission antennas on the vehicle C and to determine whether or not the magnetic field intensity of the radio wave received from each transmission antenna is within the permissible range. This more precisely eliminates accidental matches and more accurately determines the presence or absence of an irregularity or a fraud.

(9G) In each of the above-described embodiments, the process as the position detector section 21 or 61 and the process as the irregularity determiner section 22 or 62 are described as independent processes, but there is no need to be limited thereto. As is clear from the description of the first embodiment, the nine magnetic field intensities in total of three axes have a relation with the information representing the position, and with the characteristic of the direction of the magnetic fields related to the radio waves received by the portable terminal 50. Therefore, based on (i) the nine magnetic field intensities in total and (ii) the tilt information, the determination as to whether they have a predetermined relation presumed in advance may be performed, to thereby determine whether or not there is an irregularity (or fraud). For example, for each position in the vicinity of the vehicle C, a permissible range permitted for the magnetic field intensity of each of the three axes with respect to the absolute axis system may be stored as a database. The presence or absence of the irregularity may be determined depending on whether or not a value corresponding to the magnetic field intensity related to the absolute axis system of the received radio wave is present in the database.

(9H) In each of the above-described embodiments, the various processes are executed based on the magnetic field intensity of the radio wave received by the portable terminal 50, but there is no need to be limited thereto. For example, processing similar to the above-described various processing may be executed based on the electric field intensity of the radio wave received by the portable terminal 50. However, there is a case where the position of the portable terminal 50 can be more accurately determined by using the magnetic field intensity.

(9I) In each of the above-described embodiments, the frequency of the radio wave transmitted by each transmission antenna is fixed, but there is no need to be limited thereto. Radio waves of different frequencies may be transmitted by the respective transmission antennas. In that case, it is unnecessary to time-divisionally detect the intensities of the magnetic fields due to the radio waves transmitted from the respective transmission antennas, and the processing period of time can be shortened.

(5e) A plurality of functions of one element in the above embodiments may be implemented by a plurality of elements, or one function of one element may be implemented by a plurality of elements. A plurality of functions of a plurality of elements may be implemented by one element, or one function implemented by a plurality of elements may be implemented by one element. A part of the configuration of each of the above embodiments may be omitted. At least a part of the configuration of each of the above embodiments may be added to or replaced with another configuration of one of the above embodiments. Further, all aspects included in the technical ideas specified only by the language described in the claims are considered embodiments of the present disclosure.

(9K) In addition to the above-described vehicle system, in-vehicle apparatus and portable terminal, the present disclosure may be achieved in various forms such as a system including the in-vehicle apparatus or the portable terminal in the vehicle system as an element, a program for causing a computer to function as the in-vehicle apparatus or the portable terminal in the vehicle system, a non-transitory tangible storage medium such as a semiconductor memory in which the program is recorded, a vehicle control method, and the like.

It is noted that additional description relating to a configuration of a control circuit is made below. Although the above embodiments describe a configuration of a control circuit (i.e., the control circuit 20 and the control circuit 60), another configuration of such a control circuit may be employed, as summarized below.

A control circuit, which may be also referred to as a controller or an electronic control unit, may further include an interface communicating with an external apparatus, a storage, and an internal communication line connecting the foregoing components to each other and may be combined with another control circuit.

Such a control circuit provides a plurality of functions and may include sections to provide the respective functions In addition, the flowcharts (described above) executed by a control circuit similarly include sections, e.g., each represented as S11, S51, and the like. Such sections may be included in not only one control circuit but also may be divided to be included in two or more control circuits (i.e., included in at least one control circuit). Several sections may be combined into a single section; one section may be divided into several sections. Each section may be also referred to or achieved as a processor, controller, detector, device, module, or the like.

Furthermore, an individual one of the sections, processors, or the like included in at least one control circuit, or an individual control circuit of the at least one control circuit may be achieved by using or by including (i) at least one hardware circuit including analog circuit and/or digital circuit, or (ii) at least one processing unit such as a CPU in a computer along with memory storing instructions as a non-transitory tangible computer-readable storage medium storing instructions of program executed by the CPU, or (iii) a combination of the at least one hardware circuit and the at least one processing unit along with memory storing instruction, to thereby provide the functions.

For reference to further explain features of the present disclosure, a comparative technique is described as follows. There is a vehicle system including a portable terminal carried by a user of a vehicle and an in-vehicle apparatus mounted on the vehicle to have a communication with the portable terminal. In such a vehicle system, when the portable terminal enters a range within a predetermined distance from the vehicle, the communication is automatically performed between the in-vehicle apparatus and the portable terminal. For example, when the in-vehicle apparatus transmits a request signal to the portable terminal, the portable terminal transmits an answer to the in-vehicle apparatus. There may be cases that a repeater that receives and relays the radio waves from the in-vehicle apparatus. In such cases, even if the portable terminal is located at a position away from the in-vehicle apparatus, the portable terminal would perform communication processing as if the portable terminal is within the predetermined distance from the in-vehicle apparatus (hereinafter referred to as performing an erroneous operation).

Responding thereto, since the repeater's antenna has typically only one axis, there is proposed a technique in which the radio waves transmitted from the in-vehicle apparatus to the portable terminal be circular polarized waves (that is, radio waves composed of rotating magnetic field).

However, as a result of detailed study by the inventors, in cases that a repeater can reproduce the rotating magnetic field, e.g., by providing the repeater with a plurality of antennas, the portable terminal receives the same circularly polarized waves as those transmitted from the in-vehicle apparatus. When a repeater capable of reproducing a rotating magnetic field is used, the above proposed technique may therefore fail to determine accurately whether the radio wave received by the portable terminal is a radio wave relayed by the repeater or a radio wave directly transmitted from the in-vehicle apparatus. This cannot prevent the portable terminal from executing an erroneous operation.

It is thus desired to provide a technology capable of determining accurately whether or not a radio wave received by the portable apparatus is a radio wave directly transmitted from the in-vehicle apparatus even if the radio wave transmitted from the in-vehicle apparatus is relayed by a repeater having a plurality of antennas.

Aspects of the disclosure described herein are set forth in the following clauses.

According to a first aspect of the present disclosure, a vehicle system includes (i) a portable terminal held by a user of a vehicle and (ii) an in-vehicle apparatus mounted to the vehicle and capable of communicating with the portable terminal by transmitting a radio wave including a linearly polarized wave. The vehicle system is provided to include a position detector section, an orientation detector unit, and a determiner section.

The position detector section is included by the portable terminal or the in-vehicle apparatus and is configured to detect information representing a position of the portable terminal with respect to the in-vehicle apparatus, the position including at least a planar position of the portable terminal. The orientation detector unit is included by the portable terminal or the in-vehicle apparatus and is configured to detect information representing an orientation of the portable terminal, the orientation being three-dimensional. The determiner section is included by the portable terminal or the in-vehicle apparatus and is configured to perform a determination as to whether or not a radio wave received by the portable terminal is a radio wave directly transmitted from the in-vehicle apparatus based on (i) a characteristic relating to a direction of a magnetic field or an electric field in the radio wave received by the portable terminal, (ii) the information representing the position detected by the position detector section and (iii) the information representing the orientation detected by the orientation detector unit.

The first aspect may provide the following effects. That is, if the information representing the position detected by the position detector section and the information representing the orientation detected by the orientation detector unit are acquired, the characteristic related to the direction of the magnetic field or electric field of the radio wave received by the portable terminal disposed at the position corresponding to the information representing the position with the orientation corresponding to the information representing the orientation can be estimated. For example, a vector direction of the magnetic field of the radio wave, which the portable terminal receives directly from the in-vehicle apparatus, can be estimated with respect to the X, Y, Z coordinate axes set in the portable terminal. In addition, various other characteristics such as components in the direction of each coordinate axis of the magnetic field or electric field may be adopted.

The determiner section thereby determines whether a radio wave received by the portable terminal is a radio wave directly received from the in-vehicle apparatus, based on (i) the characteristic relating to the direction of the magnetic field or electric field, (ii) the information representing the position, and (iii) the information representing the orientation. Even if a repeater having a plurality of antennas is used to relay a radio wave transmitted from the in-vehicle apparatus, it is difficult for the characteristic related to the direction of the magnetic field or electric field of the radio wave received by the portable terminal to be matched with the characteristic corresponding to the information representing the position and the information representing the orientation. The vehicle system according to the first aspect is enabled to accurately determine whether a radio wave received by the portable terminal is a radio wave directly received from the in-vehicle apparatus.

According to a second aspect of the present disclosure, a vehicle system is provided to include (i) an intensity acquirer section to replace the position detector section in the first aspect, (ii) an orientation detector unit, and (iii) a determiner section. The intensity acquirer unit is included in the portable terminal and is configured to acquire a plurality of magnetic field intensities or electric field intensities of a plurality of radio waves received by the portable terminal in three axial directions that are not on an identical plane in the portable terminal, the plurality of radio waves being transmitted by the in-vehicle apparatus respectively from a plurality of locations in the vehicle. The orientation detector unit is included by the portable terminal or the in-vehicle apparatus and is configured to detect information representing an orientation of the portable terminal, the orientation being three-dimensional. The determiner section is included by the portable terminal or by the in-vehicle apparatus and configured to perform a determination as to whether or not a radio wave received by the portable terminal is a radio wave directly transmitted from the in-vehicle apparatus based on (i) respective values of the plurality of magnetic field intensities or electric field intensities acquired by the intensity acquirer unit and (ii) the information representing the orientation detected by the orientation detector unit.

The second aspect may provide the following effects. That is, the respective values of the magnetic field intensities or the electric field intensities acquired by the intensity acquirer section have a specified relation with the information representing the position and also have a specified relation with the characteristic related to the direction of the magnetic field or electric field. The determiner section thereby determines whether or not a radio wave received by the portable terminal is a radio wave directly received from the in-vehicle apparatus, based on the values of the magnetic field intensities or electric field intensities and the information representing the orientation. For example, the determiner section determines whether each value of the magnetic field intensity or electric field intensity and the information representing the orientation have a predetermined relation estimated in advance for a radio wave directly received from the in-vehicle apparatus by the portable terminal. Accordingly, even such a vehicle system is enabled to accurately determine whether a radio wave received by the portable terminal is a radio wave directly received from the in-vehicle apparatus, similarly to the above-described vehicle system according to the first aspect.

According to a third aspect of the present disclosure, a portable terminal is held by a user of a vehicle to receive a radio wave including a linearly polarized wave transmitted from an in-vehicle apparatus mounted to the vehicle and communicates with the in-vehicle apparatus. The portable terminal is provided to include a position detector section, an orientation detector unit, and a determiner section.

The position detector section is configured to detect information representing a position of the portable terminal with respect to the in-vehicle apparatus, the position including at least a planar position. The orientation detector unit is configured to detect information representing an orientation of the portable terminal, the orientation being three-dimensional. The determiner section is configured to perform a determination as to whether or not a radio wave received by the portable terminal is a radio wave directly transmitted from the in-vehicle apparatus based on (i) a characteristic relating to a direction of a magnetic field or electric field in the radio wave received by the portable terminal, (ii) the information representing the position detected by the position detector section and (iii) the information representing the orientation detected by the orientation detector unit.

The third aspect may provide the following effects. That is, the portable terminal of the third aspect includes the position detector section, the orientation detector unit, and the determiner section, all of which are included in the vehicle system according to the first aspect. Therefore, similarly to the first aspect, the portable terminal of the third aspect can accurately determine whether or not a radio wave received by the portable terminal is a radio wave directly received from the in-vehicle apparatus.

According to a fourth aspect of the present disclosure, an in-vehicle apparatus is mounted to a vehicle to perform a communication with a portable terminal held by a user of the vehicle. The in-vehicle apparatus is provided to include a transmitter unit, an information receiver unit, and a determiner section.

The transmitter unit is configured to enable the communication by transmitting a plurality of radio waves including linearly polarized waves from transmission antennas provided at a plurality of locations in the vehicle. The information receiver unit is configured to receive first information and second information from the portable terminal. The first information represents an orientation of the portable terminal, the orientation being three-dimensional. The second information represents a plurality of magnetic field intensities or electric field intensities of a plurality of radio waves received by the portable terminal in three axial directions that are not on an identical plane in the portable terminal, the plurality of radio waves transmitted by the in-vehicle apparatus respectively from the plurality of locations in the vehicle. The determiner section is configured to perform a determination as to whether or not a radio wave received by the portable terminal is a radio wave directly transmitted from the in-vehicle apparatus based on (i) the first information representing the orientation received by the information receiver unit and (ii) respective values of the plurality of magnetic field intensities or electric field intensities represented by the second information received by the information receiver unit.

The fourth aspect may provide the following effects. That is, the information receiver unit, which receives the information, functions as an intensity acquirer section and an orientation detector unit in the vehicle system according to the second aspect. Further, accordingly, the determiner section makes the same determination as the determiner section in the vehicle system according to the second aspect. Therefore, similarly to the second aspect, the in-vehicle apparatus of the fourth aspect can accurately determine whether a radio wave received by the portable terminal is a radio wave directly received from the in-vehicle apparatus.

What is claimed is:

1. A vehicle system including (i) a portable terminal held by a user of a vehicle and (ii) an in-vehicle apparatus mounted to the vehicle to communicate with the portable terminal by transmitting a radio wave including a linearly polarized wave, the vehicle system comprising:
an orientation detector provided in either the portable terminal or the in-vehicle apparatus, the orientation detector being configured to detect information representing an orientation of the portable terminal, the orientation being three-dimensional;
a position detector provided in either the portable terminal or the in-vehicle apparatus, the position detector being configured to detect information representing a position of the portable terminal with respect to the in-vehicle apparatus, the position including at least a planar position of the portable terminal; and
a controller provided in either the portable terminal or the in-vehicle apparatus,
the controller communicating with the orientation detector to receive the information representing the orientation of the portable terminal and communicating with the position detector to receive the information representing the position of the portable terminal,
the controller being configured to perform a determination as to whether or not a radio wave received by the portable terminal is a radio wave directly transmitted from the in-vehicle apparatus based on (i) a characteristic relating to a direction of a magnetic field or an electric field in the radio wave received by the portable terminal, (ii) the information representing the position of the portable terminal and (iii) the information representing the orientation of the portable terminal.

2. The vehicle system according to claim 1, wherein:
the portable terminal includes reception antennas configured to be acquire a magnetic field intensity or electric field intensity of the radio wave in each of three axial directions that are not on an identical plane; and
the controller performs the determination by using, as the characteristic, the magnetic field intensity or electric field intensity of the radio wave in each of the three axial directions acquired by the reception antennas.

3. The vehicle system according to claim 2, wherein
the controller performs the determination based on whether the magnetic field intensity or electric field intensity of the radio wave in each of the three axial directions acquired by the reception antennas is fall within a permissible range of the magnetic field intensity or electric field intensity of the radio wave corresponding to the information representing the position of the portable terminal and the information representing the orientation of the portable terminal.

4. The vehicle system according to claim 3, wherein:
the portable terminal includes an in-terminal transmitter configured to transmit the magnetic field intensity or electric field intensity of the radio wave in each of the three axial directions acquired by the reception antennas to the in-vehicle apparatus; and
the controller is provided in the in-vehicle apparatus and configured to perform the determination with respect to the magnetic field intensity or electric field intensity of the radio wave in each of the three axial directions transmitted from the in-terminal transmitter.

5. The vehicle system according to claim 1, wherein
the portable terminal is provided with the position detector, the orientation detector, the controller, and an in-terminal transmitter,
the in-terminal transmitter being connected with the controller and being configured to transmit a determination result by the controller.

6. The vehicle system according to claim 1, wherein:
the portable terminal includes a control circuit configured to issue either a starting instruction or an unlocking instruction, the starting instruction controlling whether or not to start the vehicle, the unlocking instruction controlling whether or not to unlock the vehicle; and
the portable terminal is provided with the position detector, the orientation detector, the controller, and an in-terminal transmitter,
the in-terminal transmitter being connected with the controller and the control circuit and being configured to transmit the starting or unlocking instruction depending on a determination result by the controller.

7. The vehicle system according to claim 2, wherein:
the portable terminal is provided with the position detector, the orientation detector, and an in-terminal transmitter communicating with the position detector, the orientation detector, and the reception antennas, the in-terminal transmitter being configured to transmit, to the in-vehicle apparatus, (i) the information representing the position detected by the position detector, (ii) the information representing the orientation detected by the orientation detector, (iii) the magnetic field intensity or electric field intensity of the radio wave in each of the three axial directions acquired by the reception antennas; and the in-vehicle apparatus is provided with the controller that performs the determination as to whether the radio wave received by the portable terminal is the radio wave directly received from the in-vehicle apparatus based on (i) the information representing the position of the portable terminal, (ii) the information representing the orientation of the terminal, and (iii) the magnetic field intensity or electric field intensity of the radio wave, which are transmitted from the in-terminal transmitter in the portable terminal.

8. The vehicle system according to claim 1, wherein:

the in-vehicle apparatus transmits, at respectively different time points, at least two kinds of radio waves of which directions of magnetic field or electric field cross each other; and the controller performs the determination with respect to each kind of the two kinds of radio waves.

9. The vehicle system according to claim 8, wherein depending on the information representing the position detected by the position detector, the in-vehicle apparatus performs two operations at respectively different time points, the two operations being selected from three operations including (i) an operation of transmitting a first kind of radio wave out of the two kinds of radio waves, (ii) an operation of transmitting a second kind of radio wave out of the two kinds of radio waves, and (iii) an operation of simultaneously transmitting the two kinds of radio waves in an identical phase.

10. A portable terminal held by a user of a vehicle to receive a radio wave including a linearly polarized wave transmitted from an in-vehicle apparatus mounted to the vehicle and communicate with the in-vehicle apparatus, the portable terminal comprising:

an orientation detector configured to detect information representing an orientation of the portable terminal, the orientation being three-dimensional;

a position detector configured to detect information representing a position of the portable terminal with respect to the in-vehicle apparatus, the position including at least a planar position; and a controller connected with the position detector and the orientation detector, the controller being configured to perform a determination as to whether or not a radio wave received by the portable terminal is a radio wave directly transmitted from the in-vehicle apparatus based on (i) a characteristic relating to a direction of a magnetic field or electric field in the radio wave received by the portable terminal, (ii) the information representing the position detected by the position detector and (iii) the information representing the orientation detected by the orientation detector.

* * * * *